US005482013A

United States Patent [19]
Andrews et al.

[11] Patent Number: 5,482,013
[45] Date of Patent: Jan. 9, 1996

[54] AIR INTAKE HEATING AND DIAGNOSTIC SYSTEM FOR INTERNAL COMBUSTION ENGINES

[75] Inventors: Eric B. Andrews; Mark R. Stepper, both of Columbus, Ind.

[73] Assignee: Cummins Engine Company, Inc., Columbus, Ind.

[21] Appl. No.: 311,562

[22] Filed: Sep. 23, 1994

[51] Int. Cl.$^6$ .................................................. F02P 19/00
[52] U.S. Cl. ................. 123/179.21; 123/556; 364/431.1; 219/206
[58] Field of Search .............................. 123/179.21, 556, 123/198 D; 364/431.01, 431.03, 431.04, 431.1, 424.03; 340/587, 438, 640, 449; 219/205, 206, 483, 494, 506, 481

[56] References Cited

U.S. PATENT DOCUMENTS

| | | |
|---|---|---|
| 4,295,454 | 10/1981 | Iida . |
| 4,399,774 | 8/1983 | Tsutsumi . |
| 4,506,145 | 3/1985 | Kawamura et al. ............... 123/179.21 |
| 4,545,357 | 10/1985 | Kearsley et al. . |
| 4,648,364 | 3/1987 | Wills . |
| 4,667,645 | 5/1987 | Gluckman ......................... 123/179.21 |
| 4,924,398 | 5/1990 | Fujiwara . |
| 4,962,300 | 10/1990 | Watanabe ........................... 123/179.21 |
| 5,003,954 | 4/1991 | Yakuwa et al. . |
| 5,044,196 | 9/1991 | Tomisawa et al. . |
| 5,046,473 | 9/1991 | Hokenson . |
| 5,055,825 | 10/1991 | Yang ................................. 364/431.01 |
| 5,070,832 | 12/1991 | Hapka et al. . |
| 5,094,198 | 3/1992 | Trotta et al. . |
| 5,105,789 | 4/1992 | Aramaki et al. . |
| 5,107,246 | 4/1992 | Mogaki . |
| 5,113,173 | 5/1992 | Lawson . |
| 5,122,968 | 6/1992 | Bauer et al. ........................ 364/431.1 |
| 5,133,303 | 7/1992 | Umehara . |
| 5,138,987 | 8/1992 | Schmid et al. . |
| 5,184,463 | 2/1993 | Becker et al. . |
| 5,186,045 | 2/1993 | Matsuoka et al. . |
| 5,197,430 | 3/1993 | Hoshiba et al. . |
| 5,251,440 | 10/1993 | Bong-dong et al. . |

FOREIGN PATENT DOCUMENTS 4039598  6/1992  Germany ........................... 364/431.1

*Primary Examiner*—Marguerite Macy
*Attorney, Agent, or Firm*—Woodard, Emhardt, Naughton, Moriarty & McNett

[57] ABSTRACT

An air intake heating and diagnostic system for an internal combustion engine includes a microprocessor based controller for activating electrical heating elements for a preheat time period prior to starting the engine and for a postheat time period after starting the engine. The controller receives inputs corresponding to intake manifold air temperature, battery temperature, vehicle speed, engine speed, and key switch position. The system continuously monitors the integrity of the various sensors, monitors the functionality of the heating elements during the postheat time period, and warns the vehicle operator by illuminating a "check engine" lamp if certain fault conditions are detected. In both cases, the controller sets fault flags within the controller memory corresponding to the detected fault conditions.

64 Claims, 10 Drawing Sheets

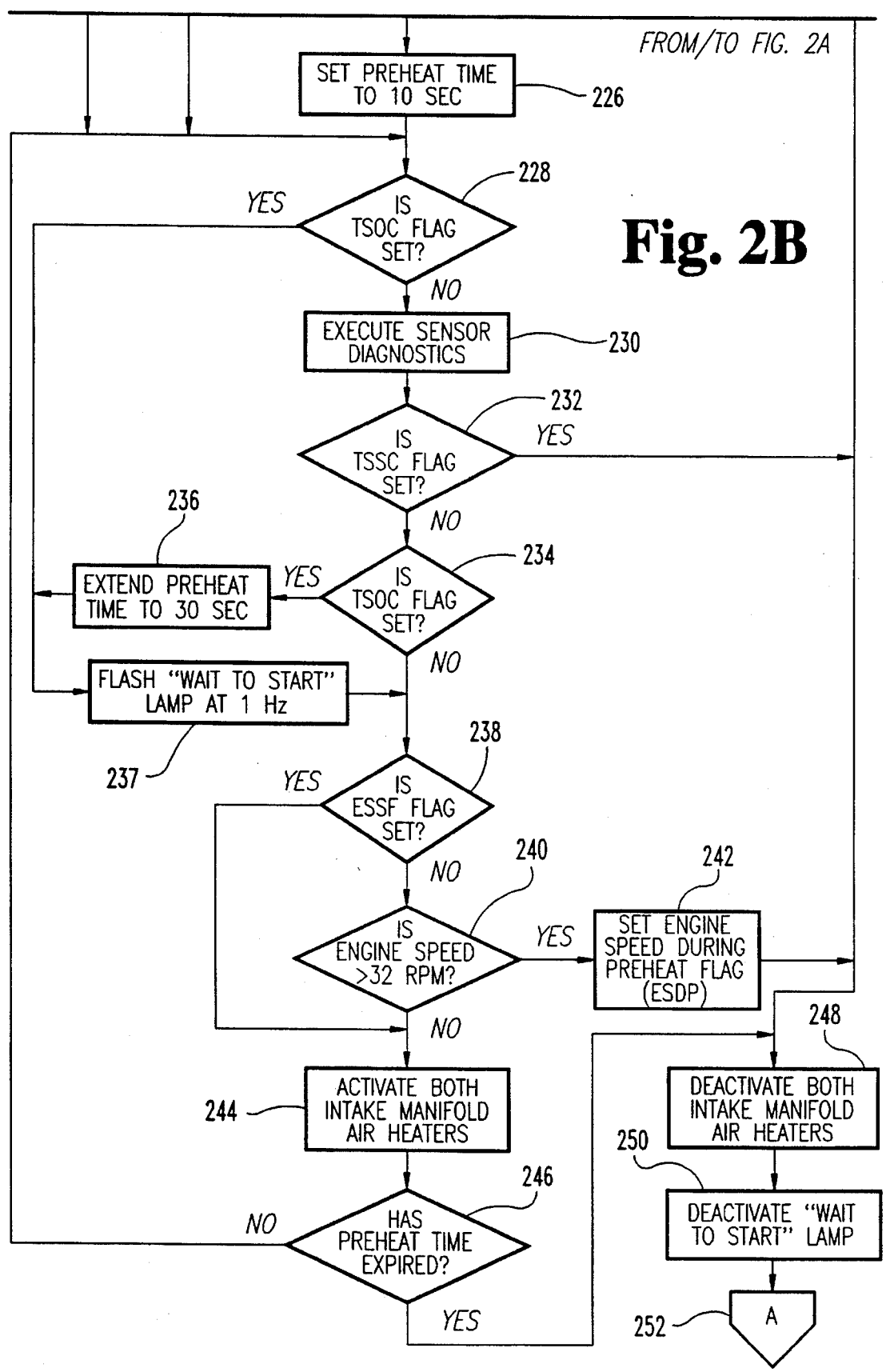

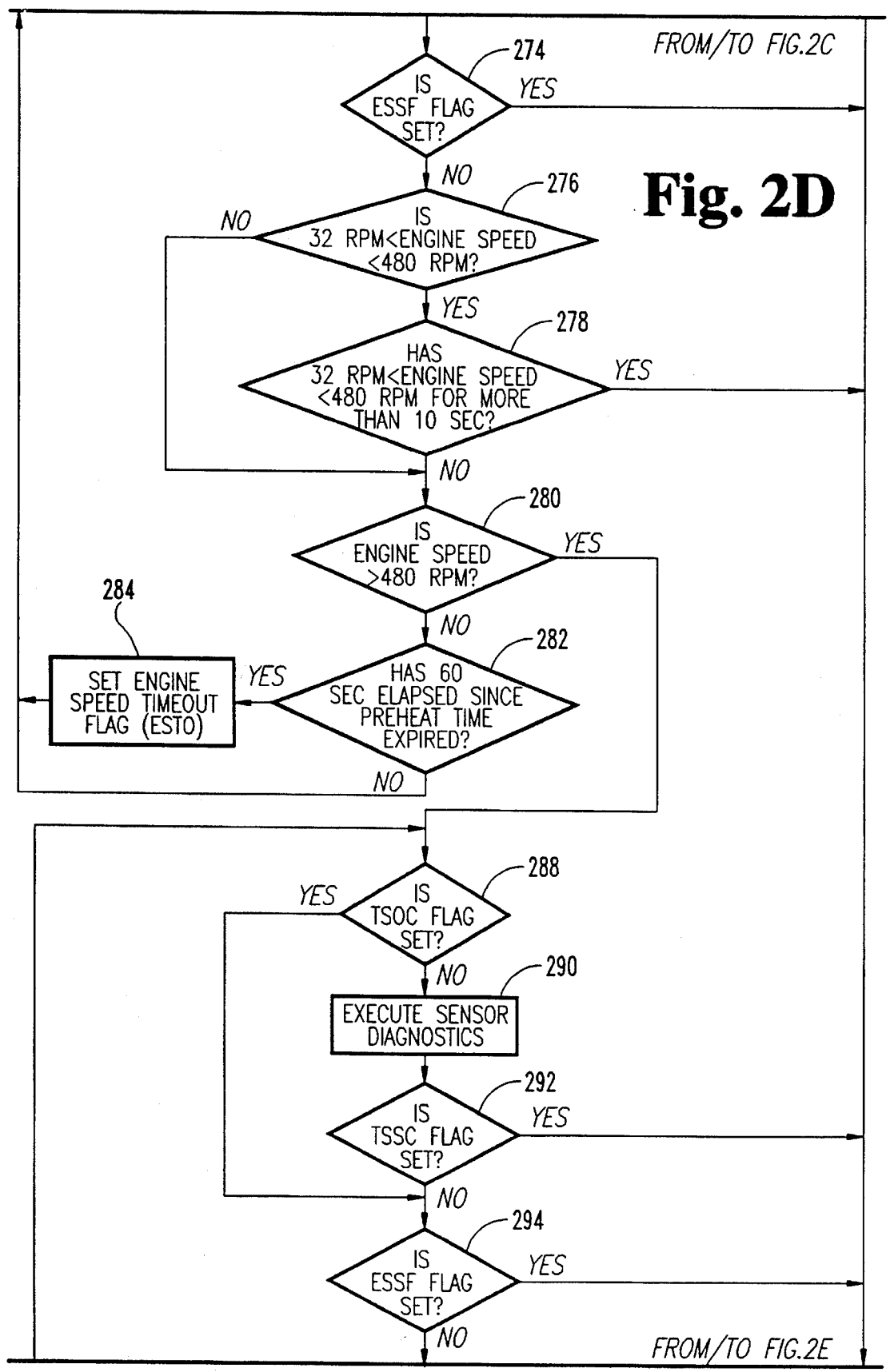

AIR INTAKE HEATING AND DIAGNOSTIC SYSTEM FOR INTERNAL COMBUSTION ENGINES

FIELD OF THE INVENTION

This invention relates in general to internal combustion engines and more specifically to air intake heating and diagnostic systems for diesel engines which aid in cold weather starting and control white smoke exhaust emissions upon starting the engine and as required thereafter during operation of the engine.

BACKGROUND OF THE INVENTION

An undesirable phenomenon known as "white smoke" is a frequent side effect of no load or light load diesel engine operation at low temperatures. This phenomenon is essentially the result of unburned hydrocarbons in the engine exhaust and is attributable to misfiring or incomplete combustion in some or all cylinders. White smoke is both a respiratory and optical irritant as well as adversely affecting visibility. While white smoke is not a regulated exhaust emission, sociability of the engine or vehicle suffers as a result of the production of white smoke.

Various prior art devices have been employed to effectuate the transfer of heat to the intake air of a diesel engine. One such electrical heating system is disclosed in U.S. Pat. No. 5,094,198 to Trotta et al., assigned to Cummins Electronics, Inc. Trotta et al. discloses a method and apparatus for preheating intake manifold air prior to starting the engine, and for postheating the intake air while the engine is running. In so doing, a pair of intake manifold air heaters are each activated for predetermined durations, and at predetermined duty cycles, according to specific ranges of intake air temperature.

The ability to monitor such intake air heating systems has been mandated by the California Air Resources Board (CARB) as part of the On Board Diagnostics (OBD) II program targeted for vehicles having internal combustion diesel engines. Since the failure of an intake air heating system may increase emissions during cold starts, CARB has taken the position that, for sociability reasons, such a system must be monitored for certain faults and failures. Under OBD II, the integrity of intake air heating system components must be continuously monitored, and the driver made aware of faults and failures which require service. It is thought that by immediately warning the driver of a fault or failure within the intake air heating system, such a condition is likely to be timely serviced. Beginning with the 1996 model year, manufacturers of vehicles having diesel engines that fail to comply with OBD II will be forbidden from selling such products in the California market. It is possible, however, for such manufacturers to obtain a one year extension from CARB in order to meet the ORD II requirements.

In order to address these and other concerns, as well as shortcomings of the prior art, the present invention provides a system and method for heating intake manifold air to reduce white smoke while providing continuous diagnostic testing of the various system componentry. Such a system complies with OBD II by continuously warning a driver, under certain conditions more fully described hereinafter, of an existing fault or failure condition within the intake manifold air heating system.

SUMMARY OF THE INVENTION

According to one aspect of the present invention, a diagnostic system for warning a vehicle operator of a fault in an air intake heating system for supplying heated air to an internal combustion engine of the vehicle is provided. The air intake heating system has means for sensing intake manifold air temperature and producing a temperature signal corresponding thereto, the engine has switch means for starting and stopping the engine, the switch means being switchable between "off", "on" and "crank" states, and the system further has means for prompting the operator to wait for a predetermined time period prior to starting the engine after switching the switch means from its "off" state to its "on" state. The diagnostic system comprises means for storing first and second predetermined reference temperature signals, first and second predetermined time periods, and means for warning the vehicle operator of an air intake heating system fault, and controller means for detecting air intake heating system faults and activating the warning means and the prompting means in response thereto. The controller means receives the temperature signal and (a) continuously activates and deactivates the prompting means at a predetermined frequency in response to the temperature signal falling below the first reference temperature signal for at least the first predetermined time period, and (b) activates the warning means in response to the temperature signal exceeding the second reference temperature signal for at least the second predetermined time period, when the switch means is switched from its "off" state to its "on" state prior to starting the engine, until the switch means is returned to its "off" state.

According to another aspect of the present invention, a method of warning a vehicle operator of a fault in an air intake heating system for supplying heated air to an internal combustion engine of the vehicle is provided. The air intake heating system has means for sensing intake manifold air temperature, the engine has switch means for starting and stopping the engine, and the switch means is switchable between "off", "on" and "crank" states. The method comprises the steps of: (1) switching the switch means from its "off" state to its "on" state, (2) sensing intake manifold air temperature, (3) comparing the sensed intake manifold air temperature to a first and second predetermined reference temperature, (4) warning the vehicle operator of one of (a) a first fault condition if the sensed intake manifold air temperature falls below the first predetermined reference temperature for at least a first predetermined time period, and (b) a second fault condition if the sensed intake air temperature exceeds the second predetermined reference temperature for at least a second predetermined time period, and (5) continuously performing steps (2)–(4) from prior to starting the engine until the switch means is switched to its "off" state to thereby stop the engine.

According to yet another aspect of the present invention, a diagnostic system for detecting faults in an air intake heating system for supplying heated air to an internal combustion engine of a vehicle is provided. The air intake heating system has means for sensing intake manifold air temperature and producing a temperature signal corresponding thereto, means for sensing engine speed level and producing an engine speed signal corresponding thereto and means for heating the intake manifold air, the engine has switch means for starting and stopping the engine, the switch means being switchable between "off", "on" and "crank" states, where the means for sensing intake manifold air temperature senses an initial air temperature when the switch means is switched from its "off" state to its "on" state prior to starting the engine. The diagnostic system comprises means for storing a number of predetermined temperature threshold levels, a predetermined time period and a number of flags, and controller means for detecting air intake heating system faults. The controller means receives the temperature and engine speed signals and continuously computes the difference between the intake manifold air temperature and the initial temperature for a predetermined postheat time period, and stores a first flag within the storing means if the difference exceeds a particular one of the number of predetermined temperature threshold levels within the predetermined time period, and stores a second flag within the storing means if the difference has not exceeded the particular one of the number of predetermined temperature threshold levels within the predetermined time period, if the initial temperature is below a first predetermined temperature level and the engine speed is above a first predetermined RPM level, and otherwise storing the first flag within the storing means.

According to yet another aspect of the present invention, a method of detecting faults in an air intake heating system for supplying heated air to an internal combustion engine of a vehicle is provided. The air intake heating system has means for sensing intake manifold air temperature, means for sensing engine speed, means for heating the intake manifold air and a memory, the engine has switch means for starting and stopping the engine, and the switch means is switchable between "off", "on" and "crank" states. The method comprises the steps of: (1) switching the switch means from its "off" state to its "on" prior to starting the engine, (2) sensing an initial intake manifold air temperature when the switch means is switched from its "off" state to its "on" state, (3) sensing engine speed after starting the engine, (4) performing steps (5)–(7) if the initial intake manifold air temperature is below a predetermined temperature level and the engine speed is above a predetermined RPM level, and otherwise storing a first flag within the memory, (5) determining the difference between the intake manifold air temperature and the initial intake manifold air temperature, (6) storing the first flag within the memory if the difference exceeds a predetermined temperature threshold level within a first predetermined time period, (7) storing a second flag within the memory if the difference does not exceed the predetermined temperature threshold level within the first predetermined time period, and (8) performing steps (5)–(7) for a second predetermined time period unless one of the first and second flags is stored within the memory.

According to a further aspect of the present invention, an air intake heating and diagnostic system for use with a vehicle having an internal combustion engine is provided. The system comprises means for sensing intake manifold air temperature and producing a temperature signal corresponding thereto, means for starting and stopping the engine, the starting and stopping means being switchable between "off", "on" and "crank" states and producing an ignition signal corresponding to each of the states, the manifold air intake temperature sensing means sensing an initial intake manifold air temperature when the ignition signal is switched from its "off" state to its "on" state, means for warning the operator of the vehicle of a fault condition detected in the system, means for heating intake manifold air, and means for controlling the air intake heating means for a variable preheat time period prior to starting the engine. The controller means has a first input for receiving the temperature signal and a second input for receiving the ignition signal. The controller means receives the temperature and ignition signals, and responds to a first fault condition by replacing the variable preheat time period with a predetermined preheat time period and activating the warning means and the intake manifold air heating means, if the temperature signal falls below a first predetermined temperature level for at least a first predetermined time period, and responds to a second fault condition by activating the warning means, deactivating the intake manifold air heating means and expiring the variable preheat time period, if the temperature signal exceeds a second predetermined temperature level for at least a second predetermined time period. The controller means activates the intake manifold air heating means for the variable preheat time period in accordance with predetermined ranges of the initial temperature if neither of the first and second fault conditions are detected within the variable preheat time period and the initial temperature is below a first predetermined temperature level.

According to still a further aspect of the present invention, a method of controlling an air intake heating system for an internal combustion engine of a vehicle for a variable preheat time period prior to starting the engine is provided. The air intake heating system has means for sensing intake manifold air temperature, means for heating intake manifold air, means for warning an operator of the vehicle of a fault detected in the system and means for prompting the operator to wait for the variable preheat time period prior to starting the engine, the engine has switch means for starting and stopping the engine, and the switch means is switchable between "off", "on" and "crank" states. The method comprises the steps of (1) switching the switch means from its "off" state to its "on" state prior to starting the engine and sensing an initial intake manifold air temperature when the switch means is switched from its "off" state to its "on" state, (2) performing steps (3)–(13) for the variable preheat time period in accordance with the initial intake manifold air temperature, if the initial intake manifold air temperature is below a first predetermined temperature level, (3) activating the prompting means, (4) sensing the intake manifold air temperature and comparing the intake manifold air temperature to first and second reference temperatures, (5) performing steps (6)–(8) if the intake manifold air temperature falls below the first predetermined reference temperature for a first predetermined time period, (6) setting the variable preheat time period to a predetermined preheat time period, (7) activating the intake manifold air heating means, (8) continuously activating and deactivating the prompting means at a predetermined frequency; (9) performing steps (10)–(12) if the intake manifold air temperature exceeds the second predetermined reference temperature for a second predetermined time period, (10) deactivating the intake manifold air heating means and the prompting means if the intake manifold air heating means and the prompting means are activated, (11) activating the warning means, (12) expiring the variable preheat time period, and (13) otherwise activating the intake manifold air heating means.

According to yet a further aspect of the present invention, an air intake heating and diagnostic system for use with a vehicle having an internal combustion engine is provided. The system comprises means for sensing intake manifold air temperature and producing a temperature signal corresponding thereto, means for sensing engine speed and producing an engine speed signal corresponding thereto, means for starting and stopping the engine, the starting and stopping means being switchable between "off", "on" and "crank" states and producing an ignition signal corresponding to each of the states, the means for sensing manifold air temperature sensing an initial temperature when the starting and stopping means is switched from its "off" state to its "on" state prior to starting the engines, means for heating intake manifold air, and means for controlling the air intake heating means for a predetermined postheat time period after starting the engine. The controller means has memory, a first input for receiving the temperature signal, a second input for receiving the engine speed signal and a third input for receiving the ignition signal. The controller means receives the temperature, engine speed and ignition signals and activates the intake manifold air heating means for the predetermined postheat time period in accordance with predetermined ranges of the initial temperature and predetermined ranges of the engine speed if the initial temperature is below a first predetermined temperature and the engine speed is above a predetermined RPM level. The controller means further continuously computes the difference between the intake manifold air temperature and the initial temperature for the duration of the predetermined postheat time period, and stores a first flag within the memory if the difference exceeds a predetermined threshold temperature level. The controller further stores a second flag within the memory if the difference has not exceeded the predetermined threshold level within a first predetermined time period.

According to still another aspect of the present invention, a method for controlling an air intake heating system for an internal combustion engine of a vehicle after starting the engine is provided. The air intake heating system has means for sensing intake manifold air temperature, means for sensing engine speed, means for heating intake manifold air and electronic memory, the engine has switch means for starting and stopping the engine, where the switch means is switchable between "off", "on" and "crank" states. The method comprises the steps of (1) switching the switch means from its "off" state to its "on" state prior to starting the engine and sensing an initial intake manifold air temperature when the switch means is switched from its "off" state to its "on" state, (2) performing steps (3)–(7) if the engine speed exceeds a first predetermined RPM level and the initial intake manifold air temperature is below a first predetermined temperature level, and otherwise storing a first flag within the memory, (3) sensing the engine speed and activating the intake manifold air heater means in accordance with predetermined ranges of the initial intake of the manifold air temperature and a predetermined ranges of the engine speed, (4) continuously sensing the intake manifold air temperature, (5) determining the difference between the intake manifold air temperature and the initial intake manifold air temperature, (6) storing a first flag within the memory if the difference exceeds a predetermined threshold temperature, (7) storing a second flag within the memory if the difference does not exceed the first predetermined temperature threshold within a first predetermined time period, and (8) performing steps (3)–(7) for a predetermined postheat time period unless one of the first and second flags is stored within memory.

According to yet a further aspect of the present invention, an air intake heating and diagnostic system for use with a vehicle having an internal combustion engine is provided. The system comprises at least one temperature sensor for sensing intake manifold air temperature and producing a temperature signal corresponding thereto, at least one engine speed sensor for sensing engine speed and producing an engine speed signal corresponding thereto, a switch for starting and stopping the engine, the switch being switchable between "off", "on" and "crank" states and producing an ignition signal corresponding to each of the states, the temperature sensor sensing an initial air temperature when the switch is switched from its "off" state to its "on" state prior to starting the engine, means for prompting an operator of the vehicle to wait a variable preheat time period after switching the switch from its "off" state to its "on" state before switching the switch from its "on" state to its "crank" state to thereby start the engine, means for warning the operator of the vehicle of a fault condition detected in the system, a number of intake manifold heaters, and a controller for controlling the intake manifold air heaters. The controller has a memory, a first input for receiving the temperature signal, a second input for receiving the ignition signal and a third input for receiving the engine speed signal. The controller receives the temperature, ignition and engine speed signals, and activates the warning means until the switch is switched to its "off" state if the temperature sensor is detected as being short circuited. The controller further activates the intake manifold air temperature and continuously activates and deactivates the prompting means at a predetermined frequency for a predetermined preheat time period if the temperature sensor is detected as being open-circuited, activates the intake manifold air heaters for the variable preheat time period in accordance with predetermined ranges of the initial temperature if the temperature sensor is detected as being neither of open-circuited or short-circuited within the variable preheat time period, activates the intake manifold heaters for a predetermined postheat time period after starting the engine in accordance with predetermined ranges of the initial temperature and predetermined ranges of the engine speed, if the temperature sensor is not detected as being short-circuited, stores a "pass" flag within the memory if the intake manifold air heaters are detected as operating during the variable postheat time period, and stores a "fail" flag within the memory if the intake manifold air heaters are detected as being inoperable during the variable postheat time period.

According to still another aspect of the present invention, a method of controlling an air intake heating system for an internal combustion engine of a vehicle is provided. The air intake heating system has means for sensing intake manifold air temperature, means for sensing engine speed, means for heating intake manifold air, means for warning an operator of the vehicle of a fault within the system and electronic memory, the engine has switch means for starting and stopping the engine, where the switch means is switchable between "off", "on" and "crank" states, and the system further has means for prompting the operator to wait before switching the switch means from its "on" state to its "crank" state, after switching the switch means from its "off" state to its "on" state, prior to starting the engine. The method comprises the steps of (1) switching the switch means from its "off" state to its "on" state prior to starting the engine, (2) sensing an initial intake manifold air temperature when the switch means is switched from its "off" state to its "on" state, (3) continuously monitoring the temperature sensor means for one of an open-circuit fault and a short-circuit fault, (4) performing steps (5)–(7) if the initial intake manifold air temperature is below a first predetermined temperature, (5) activating the intake manifold air temperature heating means and continuously activating and deactivating the prompting means at a predetermined frequency for a first predetermined preheat time period and storing a first temporary flag within the memory, if the open-circuit fault is detected, (6) activating the warning means until the switch means is returned to its "off" state, storing a second permanent flag within the memory and deactivating the intake manifold air heating means, if the short-circuit fault is detected, (7)

activating the intake manifold air heating means for a variable preheat time period in accordance with predetermined ranges of the initial temperature if neither of the open-circuit fault and the short-circuit fault is detected within the variable preheat time period, (8) performing steps (9)–(11) if the engine speed exceeds a first predetermined RPM level and the initial intake manifold air temperature is below the first predetermined temperature, (9) activating the intake manifold air heater means for a predetermined postheat time period in accordance with predetermined ranges of the initial temperature and predetermined ranges of the engine speed, (10) storing a third flag within the memory if the intake manifold air heater means is detected as operating during the predetermined postheat time period, and (11) storing a fourth flag within the memory if the intake manifold air heater means is detected as being inoperable during the predetermined postheat time period.

These and other objects of the present invention will become more apparent from the following description of the preferred embodiment.

BRIEF DESCRIPTION OF THE DRAWINGS

FIG. 2B is a continuation of the flowchart of FIG. 2A.

FIG. 2D is a continuation of the flowchart of FIG. 2C.

DESCRIPTION OF THE PREFERRED EMBODIMENT

Figure 1:
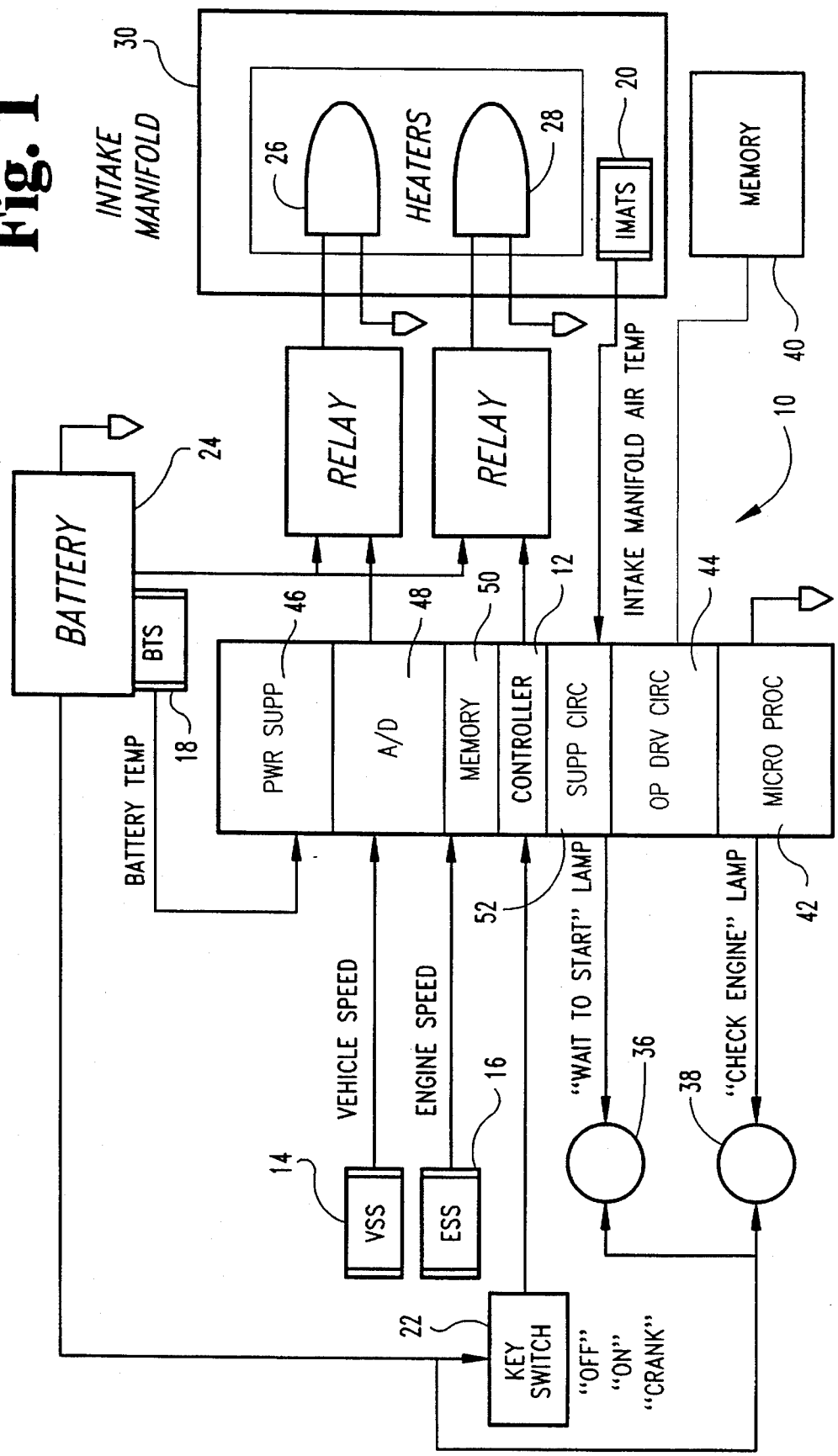
FIG. 1 is a diagrammatic illustration of an air intake heating and diagnostic system according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a diagrammatic illustration of a microprocessor controlled air intake heating and diagnostic system 10 according to the present invention is shown. The battery 24 provides battery voltage to relays 32 and 34, key switch 22, "wait to start" lamp 36 and "check engine" lamp 38, as well as many other electrical vehicle components, (not shown). Typically, battery voltage is approximately 12–14 volts, but the system 10 of the present invention must be operable with battery voltages as low as 7 volts and as high as 24 volts. Key switch 22 is a three-position switch having an "off" position, an "on" position and a "crank" position. In the "off" position, key switch 22 disconnects battery voltage from the controller 12. In the "on" position, key switch 22 supplies battery voltage to the controller 12. In the "crank" position, key switch 22 further supplies battery voltage to an engine starter system (not shown) in order to start the engine. The three key positions, or states, described above for key switch 22 correspond to those normally encountered in a motor vehicle wherein the key switch is initially switched from the "off" position to the "run" position to supply power to the electrical system of a vehicle and upon further rotation of the switch to the "crank" position, a starter solenoid of the vehicle is engaged to start the engine. Although the key switch 22 just described is used in a preferred embodiment, the present invention contemplates other switch means for accomplishing the key switch function. For example, a "software key", or software controlled system, may be used to actuate a system of relays or other switches in order to supply battery voltage to the necessary electrical components.

The system 10 includes as its central component a controller 12. Controller 12 is a microcomputer including a microprocessor portion 42, an output driver portion 44 including output interface circuitry, a power supply portion 46, an analog-to-digital convertor portion 48, a memory portion 50 and a supporting circuitry portion 52.

The microprocessor portion 42 runs software routines and manages the overall operation of the system 10. The microprocessor portion 42 may contain the analog-to digital converter portion 48 for converting analog sensor signals to digital signals for further processing by the microprocessor portion 42. In a preferred embodiment, microprocessor portion 42 of controller 12 is a Motorolla 68336 microprocessor.

The memory portion 50 of controller 12 may include ROM, RAM, EPROM, EEPROM, Flash PROM and any other reusable type of memory known to those skilled in the art. The memory portion 50 may be further supplemented by memory 40 connected thereto as shown by a dashed-line connection. Memory 40 may include any of the memory features described with respect to memory portion 50. Memory 40 may also be used to supplant memory portion 50 if controller 12 lacks a memory portion 50 or if memory portion 50 provides inadequate storage. Finally, the microprocessor portion 42 may include sufficient memory (including ROM and RAM) to obviate the need for memory portion 50 and/or supplemental memory 40.

The power supply portion 46 of controller 12 receives electrical power from the battery 24 through key switch 22 when key switch 22 is in the "on" position, and supplies electrical power to the various controller portions as well as supporting circuitry which may be added to the system 10. The output driver portion 44 of controller 12 supplies power output signals capable of driving relays, switches and the like.

The supporting circuitry portion 52 may include, for example, interface circuitry for conditioning input signals, a UART, load dump and electrostatic discharge (ESD) protection circuitry, buffer circuitry and other circuitry commonly associated with microcomputers.

Heating elements 26 and 28 are located within the air intake manifold assembly 30. In a preferred embodiment, heating elements 26 and 28 are disposed adjacent to the intake manifold air inlet so that intake air is drawn over elements 26 and 28 before entering the intake manifold 30 during engine operation. Alternatively, heating elements 26 and 28 may be located inside the intake manifold 30 so that intake air is drawn into the engine through the intake manifold 30 and over elements 26 and 28 during operation of the engine. Heating elements 26 and 28, in a preferred embodiment, are rated at 1,050 watts, although the present invention contemplates using heating elements 26 and 28 rated as low as 500 watts and as high as 1,500 watts. Relays 32 and 34 connect heaters 26 and 28 to the battery 24, although another source of power, such as the alternator or an auxiliary power supply (not shown), may be used. When the controller 12 activates or energizes relays 32 and 34, battery voltage is supplied to heaters 26 and 28, respectively. Although FIG. 1 shows two heating elements 26 and 28, the present invention contemplates using a variable number of heating elements depending on the engine model, type and usage. For example, some applications may require only a single heating element while others may call for as many as 8.

In addition to the switched battery voltage supplied to the controller 12 through the key switch 22, signals corresponding to battery temperature, intake manifold air temperature, vehicle speed and engine speed are supplied to inputs of controller 12.

A battery temperature sensor (BTS) 18 provides the controller 12 with a signal corresponding to battery temperature. Although FIG. 1 shows BTS 18 as being attached to the battery 24, the present invention also contemplates locating BTS 18 within the battery 24 itself.

An intake manifold air temperature sensor (IMATS) 20 is disposed within the intake manifold of the engine and provides controller 12 with a signal corresponding to the temperature of the air entering the intake manifold.

An engine speed sensor (ESS) 16 supplies engine speed signals to controller 12 and is used to detect a stalled, cranking and running engine, as well as determined certain engine speed threshold levels discussed hereinafter. In a preferred embodiment, a stalled or stopped engine is defined as having an engine speed of less than 32 revolutions per minute (RPM). A cranking engine is defined as having an engine speed of greater than 32 RPM and less than 480 RPM, and a running engine is defined as having an engine speed above 480 RPM.

A vehicle speed sensor (VSS) 14 provides controller 12 with a signal corresponding to the speed of the vehicle, and is used to establish an engine load threshold more fully described hereinafter.

In a preferred embodiment, BTS 18, VSS 14, ESS 16 and IMATS 20 are analog sensors known in the automotive art. The present invention also contemplates using sensors that supply digital signals corresponding to the sensed parameter in order to accomplish the above-described functions. In so doing, the analog-to-digital convertor portion 48 of controller 12 is no longer necessary and may be omitted. The present invention further contemplates using redundant sensors within the system 10 so that the system 10 may remain fully operational while awaiting service on the failed or faulty sensor.

Controller 12 further supplies signals to operator prompting device 36 and operator warning device 38. Operator prompting device 36 is a means for prompting the vehicle operator to wait for a predetermined preheat time period before starting the engine, after switching the key switch from the "off" position to the "on" position. Operator warning device 38 is a means for warning the operator of a fault or failure condition within the air intake heating system 10. Devices 36 and 38 are connected to the battery 24, or similar power source as described above with respect to the heaters 26 and 28, and are actuated by signals supplied by controller 12. In a preferred embodiment, the prompting means 36 is a "wait to start" lamp, as shown in FIG. 1, which is located within the cab area of the vehicle and is illuminated by the controller 12 to signal to the operator to wait for the preheat time period before starting the engine. The lamp 36 is deactivated by the controller 12 when the preheat time period has elapsed, thereby signalling the operator to start the engine. The warning means 38, in a preferred embodiment, is a "check engine" lamp, as shown in FIG. 1, which is standard on most vehicles and is located within the instrument panel or cluster (not shown). The "check engine" lamp 38 is illuminated by the controller 12 to warn the vehicle operator of a fault condition within the intake air heating system, and continues to warn the operator until the key switch is returned to the "off" position.

The "wait to start" lamp 36 or the "check engine" lamp 38 may be an incandescent lamp, any number of light emitting with an optical waveguide. Moreover, the present invention with an optical waveguide. Moreover, the present invention contemplates locating lamps 36 and 38 anywhere on the vehicle that may be observed by the vehicle operator while operating the vehicle. Finally, the present invention contemplates that either device 36 or 38 may be, or include, an audible device for providing an audible signal, corresponding to the required function, to the vehicle operator.

In operation, the controller 12 energized or activates heaters 26 and 28 for a variable preheat time period prior to starting the engine in accordance with the initial temperature of the intake manifold air. If "preheat" is successfully completed, the controller 12 cycles heaters 26 and 28 after the engine has been started, for various time periods and duty cycles, for the duration of a postheat time period in accordance with the engine speed and initial temperature of the intake manifold air. Under certain conditions, more fully described hereinafter, the controller 12 continuously runs a heater diagnostic check during postheat to test the operation of heaters 26 and 28. If preheat is not successfully completed, the heater diagnostic check will be aborted. Regardless of the preheat and postheat operations, however, the controller 12 continuously executes a sensor diagnostics check from key switch 22 "on" to key switch 22 "off" to test each of the VSS 14, ESS 16, BTS 18 and IMATS 20 for faults and/or failures. Under certain failure or fault conditions, the vehicle operator is warned of the condition and certain sensor fault flags are set within memory portion 50 of controller 12.

The specific detail of the intake air heating and diagnostic system 10 operation will now be described with reference to FIG. 1. Controller 12 is powered up when key switch 22 is switched from the "off" position to the "on" position. Upon power up, controller 12 resets or initializes its air intake heating and diagnostic algorithm, illuminates the "wait to start" lamp 36, and begins to monitor all sensors for functionality.

If controller 12 senses an initial intake manifold air temperature (IMAT) below a predetermined temperature level for longer than a predetermined time period, controller 12 assumes that IMATS 20 is open-circuited and sets a temporary temperature sensor open-circuit (TSOC) flag within memory portion 50. On the other hand, if controller 12 senses an initial IMAT above another predetermined level for another predetermined time period, controller 12 assumes that IMAMTS 20 is short-circuited and sets a permanent temperature sensor short-circuit (TSSC) flag within memory portion 50. In a preferred embodiment, controller 12 detects an open-circuited IMATS 20 if the voltage supplied by IMATS 20 to the analog-to-digital portion 48 of controller 12 is below a valid lower threshold voltage level. Although an IMATS 20 voltage reading below the valid lower threshold voltage level may not correspond to an actual open-circuited IMATS, it is treated as such by the controller 12 since such an invalid voltage reading is indicative of an IMATS 20 fault condition. IMATS 20 voltages readings of below the valid lower threshold voltage level correspond to any temperature reading of below −40 degrees F. Similarly, controller 12 detects a short-circuited IMATS 20 if the voltage supplied by IMATS 20 to the analog-to-digital portion 48 of controller 12 is above a valid upper threshold voltage level. Although an IMATS 20 voltage reading above the valid upper threshold voltage level may not correspond to an actual short-circuited IMATS, it is treated as such by the controller 12 since such an invalid voltage reading is indicative of an IMATS 20 fault condition. IMATS 20 voltages readings of above the valid upper threshold voltage level correspond to any temperature reading in excess of 250 degrees F. In one embodiment, the controller 12 activates the "check engine" lamp 38 until the key switch 22 is returned to the "off" position only if a TSSC condition is detected. In another embodiment, controller 12 activates the "check engine" lamp 38 until key switch 22 is returned to the "off" position in response to any invalid IMATS 20 voltage reading being detected by controller 12 for longer than 5 seconds. Although the predetermined time period is set at 5 seconds in a preferred embodiment, the present invention contemplates predetermined time periods of between 0 and 64 seconds. The upper and lower predetermined temperature levels of 250 and −40 degrees F., on the other hand, are limitations of the IMATS 20 itself and not of the present invention. As such, the present invention contemplates upper and lower predetermined temperature levels corresponding to the limits of the valid sensor voltage vs temperature characteristics of the particular IMATS 20 being used.

If, prior to or during the preheat schedule, a TSOC flag was set, the controller 12 flashes the "wait to start" lamp 36 at approximately 1 Hz until the preheat time period has expired. Alternatively, the invention contemplates flashing other lamps in response to the TSOC flag being set, including the "check engine" lamp 38 or other lamp observable by the vehicle operator. Further, the invention contemplates ramping the lamp illumination on and off as well as other flash or ramp rates. An important requirement of this feature is that the flashing or ramping of the lamp must be discernable by the vehicle operator in contrast to the continuous illumination of the lamp.

Controller 12 further detects open-circuit and short-circuit failure conditions within BTS 18 and sets a battery temperature sensor fault (BTSF) flag within memory portion 50 in response to either. In a preferred embodiment, the BTS 18 open-circuit and short-circuit detection is performed identically to the open-circuit and short-circuit detection of IMATS 20 as previously discussed. Finally, if a VSS 14 or ESS 16 failure is detected, controller 12 sets a vehicle speed sensor fault (VSSF) flag or engine speed sensor fault (ESSF) flag, respectively, within memory portion 50. In one embodiment, the controller 12 activates the "check engine" lamp 38 if a BTSF, VSSF or ESSF flag is set within the memory portion 50. However, the present invention contemplates alternate embodiments wherein the "check engine" lamp 38 is activated in response to only certain ones of the BTSF, VSSF, ESSF, TSOC and TSSC flags being set, as well as further embodiments wherein only the foregoing flags are set in response to the corresponding fault being detected and the "check engine" lamp 38 is not activated in response thereto.

If the controller 12 determines that the initial IMAT reading is in excess of a preheat threshold temperature, then the controller 12 deactivates the "wait to start" lamp 36 and assumes that no intake manifold air preheating is necessary. In this case, heating elements 26 and 28 are not energized. Although the present invention contemplates preheat threshold temperatures between 20 and 100 degrees F. the preheat threshold temperature in a preferred embodiment is 60 degrees F. If the initial IMAT is less than 60 degrees F. the controller 12 determines a preheat schedule for energizing heaters 26 and 28 based upon the initial IMAT reading.

Table 1 provides a suggested guide for determining the preheat schedule although other initial IMAT ranges, heater combinations, preheat durations and duty cycles are contemplated.

TABLE 1

| Initial Intake Manifold Air Temp. | PREHEAT SCHEDULE | | |
|---|---|---|---|
| (IIMAT) (°F.) | Heaters | Duration (Sec) | Duty Cycle |
| IIMAT < 0 | Both | 30 | Continuous |
| 0 ≦ IIMAT < 16 | Both | 15 | Continuous |
| 16 ≦ IIMAT < 60 | Both | 10 | Continuous |

As can be seen from Table 1, if the initial intake manifold air temperature (IIMAT) is less than zero degrees F., both heaters 26 and 28 are energized continuously for a preheat duration of 30 seconds. If IIMAT is greater than or equal to zero degrees F. and less than 16 degrees F., both heaters 26 and 28 are energized continuously for a preheat duration of 15 seconds. Finally, if IIMAT is greater than or equal to 16 degrees F. and less than 60 degrees F., both heaters 26 and 28 are energized continuously for a preheat duration of 10 seconds.

If a TSSC flag was set with the initial IMAT reading, or at any time during the preheat schedule, the controller 12 assumes an initial IMAT reading in excess of 60 degrees F. and the preheat schedule is aborted. If a TSOC flag was set with the initial IMAT reading, the controller assumes an initial IMAT reading of below zero degrees F. and automatically selects the preheat schedule corresponding to IIMAT less than zero degrees F. If a TSOC flag is set at any time during the preheat schedule, the controller 12 extends the current preheat schedule to the preheat schedule corresponding to an initial IMAT reading of below 0 degrees F. If a TSOC flag is set in either case, the "wait to start" lamp 36 is flashed for the duration of the preheat schedule as previously discussed. If the controller 12 detects engine cranking (engine RPM greater than 32 RPM) at any time during the preheat schedule, the controller 12 sets an engine speed during preheat (ESDP) flag within the memory portion 50 and the remainder of the preheat schedule is aborted.

After the preheat schedule is complete, or if the preheat schedule was aborted due to a TSSC or an ESDP flag being set, the controller 12 deactivates both heaters 26 and 28 and the "wait to start" lamp 36.

Deactivating the "wait to start" lamp 36 by the controller 12 signals the vehicle operator to start the engine by switching the key switch 22 from the "on" position to the "crank" position until the engine is started. Once the engine is running, if the initial IMAT reading was less than 60 degrees F., a TSSC flag has not been set and the engine speed exceeds a postheat RPM level, postheat operation begins subject to further conditions determined by the controller 12 and described below.

First, if the vehicle speed exceeds a predetermined vehicle speed, postheat operation will not occur. In this condition, both the engine speed and load on the engine have increased, resulting in a rapid increase in engine temperature and reduction in engine warm up time. This is the preferred method of warming up a cold engine and although predetermined vehicle speeds of between 1 and 65 MPH are contemplated, the present invention uses a predetermined vehicle speed of 10 MPH. Second, if the ESSF flag has been set, postheat will be aborted. With any failure of the ESS 16, the controller 12 assumes no engine speed. Since an engine speed of at least a postheat RPM level must be achieved in order to begin postheat operation, an ESS fault or failure results in no postheat. Third, if the engine has been started less than a predetermined number of times since vehicle production, postheat operation will be disabled. This feature is intended as a pre-delivery battery saver and the predetermined number may therefore be arbitrarily chosen. In a preferred embodiment, this predetermined number is chosen to be 25. Finally, if cranking has been detected for longer than a predetermined cranking time period, postheat will be aborted. This feature is also intended as a battery saver function and, although the predetermined cranking period may be between zero and 255 seconds, this period is set at 10 seconds in the preferred embodiment.

Although the present invention contemplates postheat RPM levels of between 200 and 3,000 RPM, a postheat RPM level of 480 RPM is used in a preferred embodiment. If the controller 12 fails to detect an engine speed exceeding 480 RPM within a predetermined engine speed timeout period, the controller 12 will set an engine speed timeout (ESTO) flag within the memory portion 50. In a preferred embodiment, this predetermined engine speed timeout period is 60 seconds although timeout periods of between 5 and 255 seconds are contemplated.

Once the controller 12 successfully enters postheat operation, the controller 12 determines the appropriate postheat schedule for cycling heaters 26 and 28 during the first few moments of engine operation. The postheat schedule is determined in accordance with the initial IMAT and current engine speed. Table 2 provides a suggested guide for determining the postheat schedule although other initial IMAT ranges, heater combinations, preheat durations and duty cycles are contemplated.

TABLE 2

| Initial Intake Manifold Air Temp. | POSTHEAT SCHEDULE | | |
|---|---|---|---|
| (IIMAT) (°F.) | Heaters | Duration (Sec) | Duty Cycle |
| IIMAT < 0 | Both | 20 | Continuous |
|  | One | 10 | Continuous |
|  | One | 180 | 25/75 |
| 0 ≦ IIMAT < 16 | Both | 15 | Continuous |
| Engine RPM < 1500 | One | 195 | 25/75 |
| Engine RPM > 1500 | One | 135 | Continuous |
|  | One | 60 | 50/50 |
| 16 ≦ IIMAT < 60 | Both | 15 | Continuous |
| Engine RPM < 1500 | One | 195 | 25/75 |
| Engine RPM > 1500 | One | 135 | Continuous |
|  | One | 60 | 50/50 |

As can be seen from Table 2, if IIMAT is less than zero degrees F., both heaters 26 and 28 are continuously activated for 20 seconds. After 20 seconds have expired, one of the heaters, heater 26 for example, is continuously activated for 10 seconds while heater 28 is deactivated. After 10 seconds have expired, the other heater, heater 28 for example, is activated for 180 second at a 25% duty cycle while heater 26 is deactivated.

If IIMAT is greater than or equal to zero degrees F., both heaters 26 and 28 are continuously activated for 15 seconds. After 15 seconds have expired, one of the heaters, heater 26 for example, is activated for 195 seconds at a 25% duty cycle while heater 28 is deactivated, if the current engine speed is below 1500 RPM. If the engine speed is greater than 1500 RPM after the first 15 seconds have expired, one of the heaters, heater 26 for example, is activated continuously for 135 seconds while heater 28 is deactivated. After 135 seconds has elapsed, the other heater, heater 28 for example, is activated for 60 seconds at a 50% duty cycle while heater 26 is deactivated. If, at any time during the postheat schedule, the engine speed changes from less than 1500 RPM to greater than 1500 RPM, or vice versa, the controller 12 will activate the heaters 26 and 28 in accordance with the most recently detected engine speed.

Each of the foregoing duty cycles is based on a 10 second cycle. Thus, a 25% duty cycle corresponds to the appropriate heater being activated for 2.5 seconds and deactivated for 7.5 seconds, and a 50% duty cycle corresponds to the appropriate heater being activated for 5.0 seconds and deactivated for 5.0 seconds. Further, although the postheat time duration is approximately 210 seconds regardless of the IIMAT reading, the present invention contemplates variable postheat time durations based on IIMAT and current engine RPM levels.

Once postheat begins, the controller 12 will continue postheat operation for the duration of the postheat time period. If, however, the engine speed falls below an engine stall threshold RPM level, postheat will be aborted to avoid consuming battery power. In a preferred embodiment, the engine is considered by the controller 12 to have stalled if the engine speed falls below 32 RPM. Postheat will also be aborted if the vehicle speed exceeds 10 MPH, since this condition will cause the engine to quickly achieve running temperature as previously explained. Finally, postheat will be aborted if, during the postheat time period, the ESS 16 fails resulting in the controller 12 setting the ESSF flag.

During postheat and under certain conditions, the controller 12 continuously executes a heater diagnostics check for the duration of postheat to test the functionality of heaters 26 and 28. The conditions for executing the heater diagnostics check are determined by the controller 12 and are described below.

If the ESTO flag, TSOC flag, ESDP flag or BTSF flag is set, the heater diagnostics check will be disabled by the controller 12. Similarly, if the initial IMAT reading is more than a predetermined temperature difference from the battery temperature, the controller 12 will disable the heater diagnostics check. This feature is included as a supplemental temperature verification and is intended to improve the reliability of the heater diagnostics check. If the battery temperature and initial IMAT are approximately equal, the controller 12 assumes that the engine is undergoing a "true" cold start. However, if the two temperatures are not close, the controller 12 assumes that the ambient air temperature is lower than the engine and the heater diagnostics check is disabled. In a preferred embodiment, this predetermined temperature difference is 10 degrees F. although predetermined temperature differences of between zero and 255 degrees F. are contemplated. Naturally, if postheat operation has been aborted for any of the above-discussed reasons, the heater diagnostics check will be automatically aborted.

If the controller 12 has not disabled the heater diagnostics check for any of the aforementioned reasons, the controller 12 continuously executes the heater diagnostics check as long as postheat operation continues. In performing the heater diagnostics check, the controller 12 continuously compares the initial IMAT with the current IMAT value. If the absolute value of the difference between the two temperatures exceeds a predetermined heater diagnostic threshold temperature (HDTT) level for a predetermined time period, then the controller 12 sets a heater diagnostics test flag to "pass". However, if the absolute value of the difference between the two temperatures fails to exceed the HDTT level within the predetermined time period, the controller 12 will check the heater diagnostics test flag to determine whether it is set to "tempfail" for "temporary fail". If the heater diagnostic test flag is not set to "tempfail", the controller 12 will set this flag to "tempfail". If the heater diagnostic test flag is set to "tempfail", this means that the controller 12 detected a heater fault or failure during operation of the engine prior to most recent switching of key switch 22 from the "off" position to the "on" position. In such a case, the controller 12 replaces the "tempfail" flag with a "permfail" flag, corresponding to a permanent fault flag, and further illuminates the "check engine" lamp 38 until the key switch 22 is returned to the "off" position. If the heater diagnostic test flag is set to "permfail" in the initial sensor diagnostics check following power up (when the key switch 22 is switched from the "off" position to the "on" position), the controller 12 immediately illuminates the "check engine" lamp 38 until the key switch 22 is returned to the "off" state. In one embodiment, the heater diagnostic test flag is an tri-state flag having the above-discussed states. In an alternative embodiment, the heater diagnostic test flag includes three distinct binary flags, those flags being a "pass" flag, a "permfail" flag and a "tempfail" flag.

Table 3 provides a suggested guide for determining the heater diagnostic threshold temperature (HDTT) for the heater diagnostics check although other initial IMAT ranges and engine speed threshold values are contemplated.

TABLE 3

| | HEATER DIAGNOSTIC TEMPERATURE THRESHOLD (HDTT) | | |
|---|---|---|---|
| ENGINE SPEED | INITIAL INTAKE MANIFOLD AIR TEMP. (IIMAT) (°F.) | | |
| (RPM) | IIMAT < 0 | 0 ≦ IIMAT < 16 | 16 ≦ IIMAT < 60 |
| <1500 | 24 | 15 | 12 |
| >1500 | 12 | 10 | 8 |

From Table 3, if IIMAT is less than zero degrees F., and the engine speed is below 1500 RPM, the controller 12 sets HDTT to 24 degrees F. If the engine speed is greater than 1500 RPM, the controller sets HDTT to 12 degrees F. If IIMAT is greater than or equal to zero degrees F and less than 16 degrees F., and the engine speed is below 1500 RPM, the controller 12 sets HDTT to 15 degrees F. If the engine speed is greater than 1500 RPM, the controller 12 sets HDTT to 10 degrees F. Finally, if IIMAT is greater than or equal to 16 degrees F. and less than 60 degrees F., and the engine speed is less than 1500 RPM, the controller sets HDTT to 12 degrees F. If the engine speed is greater than 1500 RPM, the controller sets HDTT to 8 degrees F.

If the controller 12 has either completed, disabled or aborted the postheat operation, the controller 12 deactivates both heaters 26 and 28 and checks whether a heater diagnostic test (HDT) flag has been set. If not, the controller 12 sets the HDT flag to "pass". Regardless of the status of the preheat, postheat, and heater diagnostics operations, the controller 12 continues to execute the sensor diagnostics check until the key switch 22 is returned to the "off" position.

It should be pointed out that all of the foregoing numerical values may differ significantly depending upon engine model, engine rating, the vehicle in which the engine is installed and the model year of the engine and vehicle. For example, the characteristics of another engine model may require defining a "running engine" as having an engine speed in excess of 850 RPM, or a preheat duration of 5 seconds when the initial intake manifold air temperature is greater than or equal to 60 degrees and less than 75 degrees. A common air intake heating and diagnostic system 10 for use with multiple engine models, types and usages is contemplated by the present invention. To accommodate such a variety of engines, the controller 12 may include multiple sets of program data in EPROM, for example, for defining the above described numerical system parameters.

It should also be pointed out that a temporary flag is retained within memory portion 50 until the key switch 22 is returned to the "off" position. A permanent flag, on the other hand, is retained within memory until erased during service of the air intake heating and diagnostic system. Thus, when key switch 22 is returned to its "off" position, the TSOC flag, for example, will be erased from memory portion 50 while the TSSC flag, for example, will remain within memory portion 50 until it is erased by service personnel.

Figure 2A:
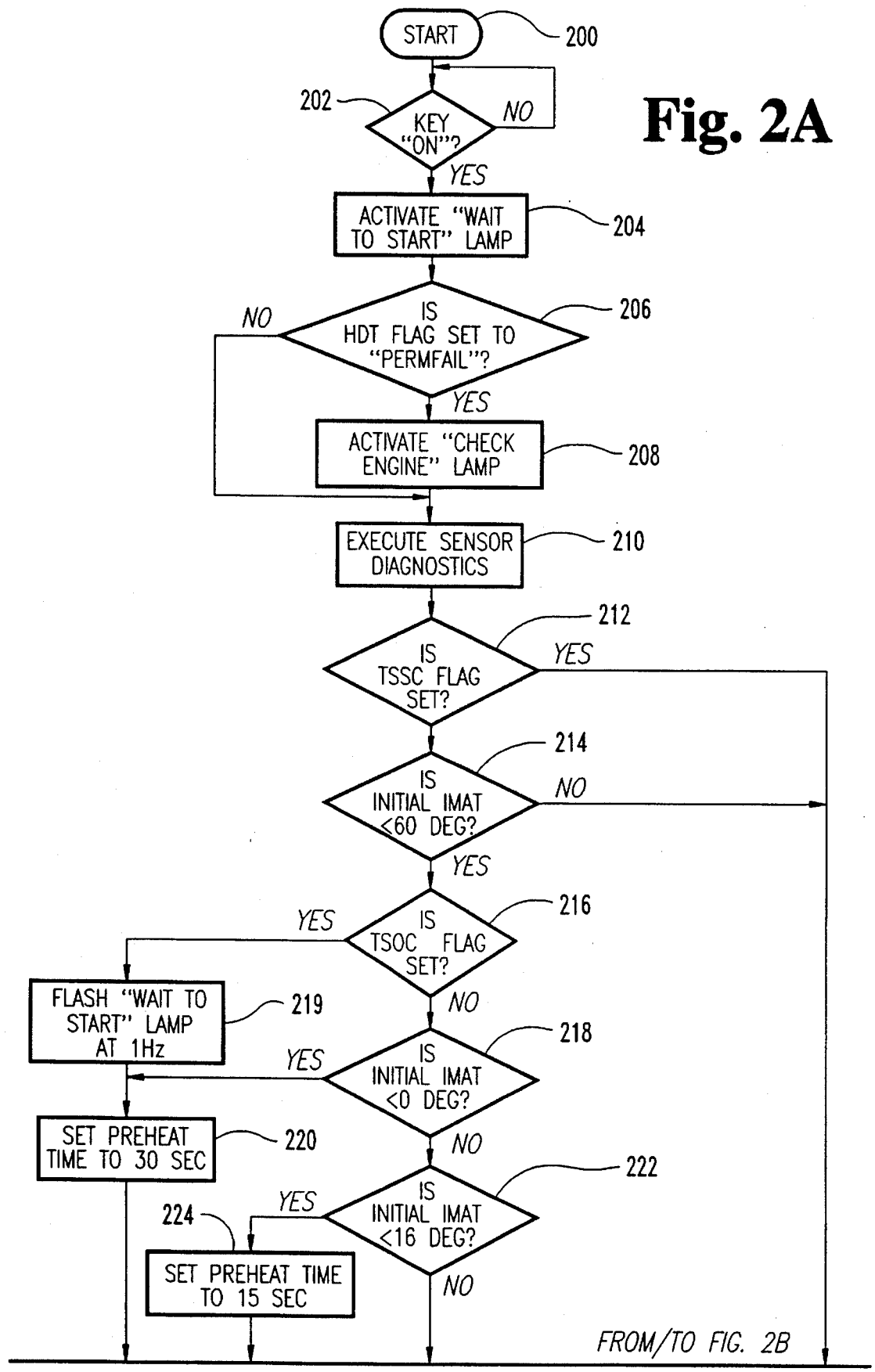
FIG. 2A is a flowchart of a heater control and system diagnostic software program executed by a microprocessor of the air intake heating and diagnostic system.
Figure 3:
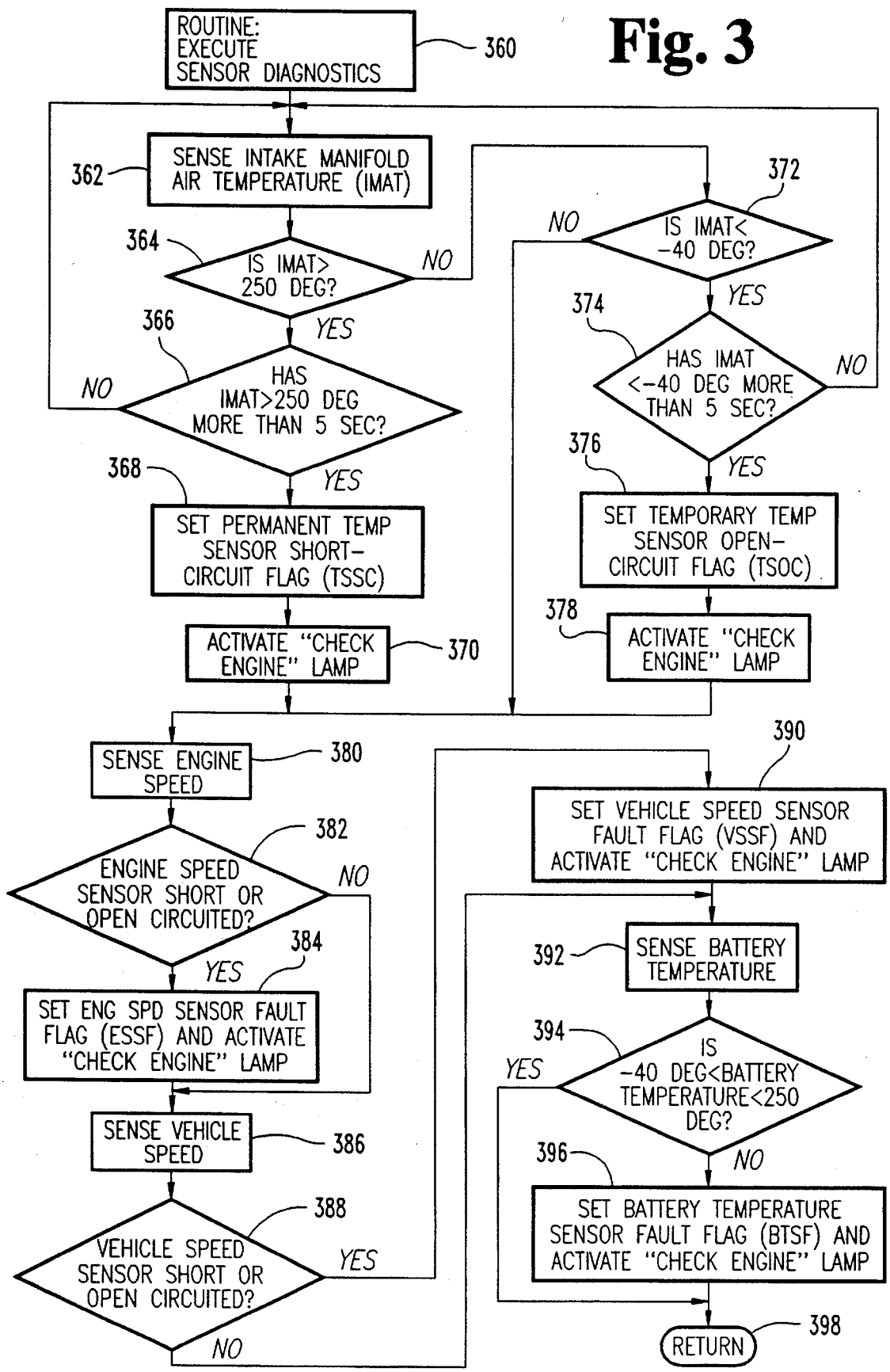
FIG. 3 is a flowchart of the sensor diagnostics subroutine of FIGS. 2A–2E.

Referring now to FIG. 2A, a flowchart depicting one embodiment of an intake air heating and diagnostic algorithm according to the present invention is shown. Such an algorithm is executable by the microprocessor portion 42 of the controller 12 and is stored within the memory portion 50. All numerical values described in relation to this flow chart represent typical values and other values are contemplated by this invention as elsewhere noted. The program begins at step 200, and at step 202 the key switch 22 is tested to determine the key position or state. If at step 202 the key switch is not in the "on" position, the algorithm continuously executes step 202 until the key switch 22 is switched to the "on" position. When key "on" is detected, the algorithm advances to step 204 where the "wait to start" lamp 36 is activated. At step 206, the status of the heater diagnostic test (HDT) flag is tested. If the HDT flag is set to "permfail", the "check engine" lamp is activated at step 208. If the HDT flag is not set to "permfail" at step 206, the algorithm advances to step 210 where the sensor diagnostics subroutine of FIG. 3 is executed. The sensor diagnostics subroutine will be more fully described hereinafter. At step 212, if the intake manifold air temperature sensor was not detected as being short-circuited (permanent TSSC flag set) at step 210, the algorithm advances to step 248. If a TSSC flag was set at step 210, the initial intake manifold air temperature (initial IMAT) is compared to a value of 60 degrees F. at step 214. If the initial IMAT is greater than or equal to 60 degrees F., the algorithm advances to step 248. If the initial IMAT is less than 60 degrees F., the status of the temporary temperature sensor open-circuit (TSOC) flag is tested at step 216. If the TSOC flag is set, the algorithm advances to step 219. If the TSOC flag is not set, the initial IMAT is compared to a temperature value of zero degrees F. at step 218. If the TSOC flag was found to be set at step 216, the "wait to start" lamp 36 is flashed at approximately 1 Hz at step 219. If the initial IMAT was less than zero degrees F. at step 218, of if flashing of the "wait to start" lamp 36 was commenced at step 219, the preheat time period is set to 30 seconds at step 220. If the initial IMAT is greater than or equal to zero degrees F. at step 218, the initial IMAT is compared to a temperature of 16 degrees F. at step 222. If the initial IMAT is less than 16 degrees, the preheat time period is set to 15 seconds at step 224. If the initial IMAT is greater than or equal to 16 degrees at step 222, the preheat time period is set to 10 seconds at step 226 of FIG. 2B.

Referring now to FIG. 2B, after the preheat time period is set at step 220, 224 or 226, the TSOC flag status is tested at step 228. If the TSOC flag is set, the algorithm advances to step 237. If the TSOC flag is not set at step 228, the sensor diagnostics subroutine of FIG. 3 is executed at step 230. At step 232, the status of the TSSC flag is tested. If a TSSC flag is set at step 230, the algorithm advances to step 248. If a TSSC flag was not set at step 230, the status of the TSOC is again tested at step 234. If the TSOC flag is set, the preheat time period is extended to 30 seconds at step 236. If the preheat time period was originally set to 30 seconds at step 220, step 236 will have no effect. If, however, the preheat time period was originally set to 15 seconds at step 224, or to 10 seconds at step 226, the appropriate time period is added to the elapsed preheat time period to achieve a total preheat time period of 30 seconds. If the TSOC flag was set at step 228, or if the preheat time period was extended to 30 seconds at step 236, the "wait to start" lamp 36 is flashed at approximately 1 Hz at step 237. If the TSOC flag is not set at step 234, or if flashing of the "wait to start" lamp 36 was commenced at step 237, the status of the engine speed sensor fault (ESSF) flag is tested at step 238. If the ESSF flag set at step 238, the algorithm advances to step 244. If the ESSF flag is not set, the engine speed is compared to a minimum engine speed cranking value of 32 RPM at step 240. If the engine speed is greater than 32 RPM (engine cranking), the engine speed during preheat (ESDP) flag is set at step 242 and the algorithm advances to step 248. If the engine speed is less than or equal to 32 RPM at step 240, both intake manifold air heaters 26 and 28 are activated at step 244. At step 246, the elapsed preheat time period is tested. If the preheat time period has not expired, the algorithm returns to step 228.

If the preheat time period has expired at step 246, the ESDP flag was set at step 242, the TSSC flag was found to be set at steps 232 or 212, or the initial IMAT was found to be greater than or equal to 60 degrees F. at step 214, both intake manifold air heaters 26 and 28 are deactivated at step 248. The "wait to start" lamp 36 is thereafter deactivated at step 250. The "continue at A" indicator 252 marks the end of the air intake heating and diagnostic preheat operation.

Figure 2C:
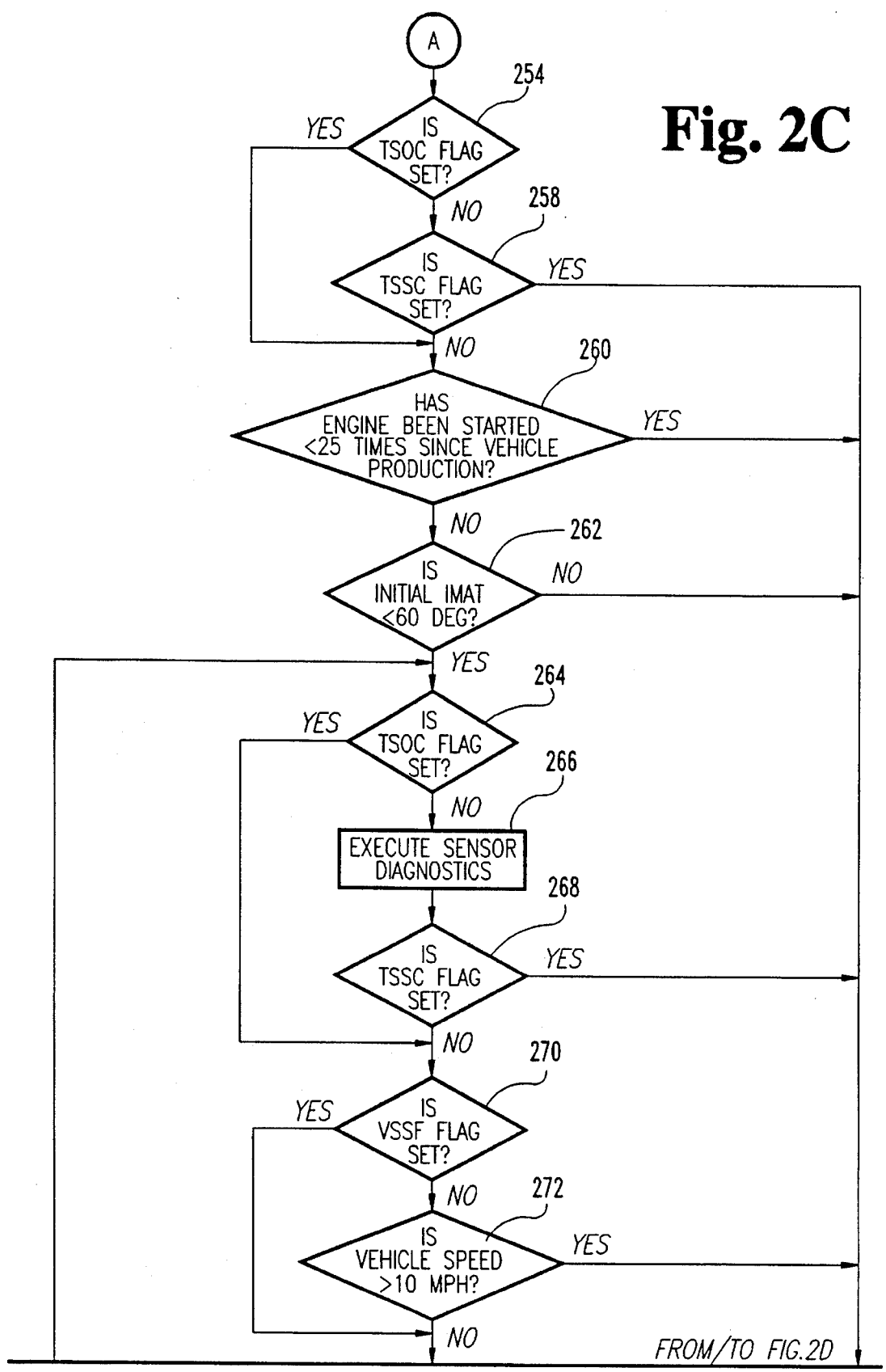
FIG. 2C is a continuation of the flowchart of FIG. 2B.

Referring now to FIG. 2C, the TSOC flag status is tested at step 254. If the TSOC flag is set, the algorithm continues at step 260. If the TSOC flag is not set at step 254, the status of the TSSC flag is tested at step 258. If a TSSC flag has been set, the algorithm continues at step 342. If a TSSC flag has not been set, or if the TSOC flag is set at step 254, the number of times the engine has been started since vehicle production is compared to a value of 25 at step 260. If the engine has been started less than 25 times, the algorithm continues at step 342. If the engine has been started 25 times or more, the initial IMAT is compared to a temperature value of 60 degrees F. at step 262. If the initial IMAT was greater than or equal to 60 degrees F. the algorithm continues at step 342. If the initial IMAT was less than 60 degrees F., the status of the TSOC flag is tested at step 264.

If the TSOC flag is set at step 264, the algorithm continues at step 270. If the TSOC flag is not set at step 264, the sensor diagnostics subroutine of FIG. 3 is executed at step 266. At step 268, the status of the TSSC flag is tested. If a TSSC flag was set at step 266, the algorithm continues at step 342. If a TSSC flag was not set at step 266, or if the TSOC flag was set at step 264, the status of the vehicle speed sensor fault (VSSF) flag is tested. If the VSSF flag is set at step 264, the algorithm continues at step 274. If the VSSF flag is not set, the vehicle speed is compared to a value of 10 MPH. If the vehicle speed is in excess of 10 MPH, the algorithm continues at step 342.

Referring now to FIG. 2D, if the vehicle speed is 10 MPH or less at step 272, or if the VSSF flag is set at step 270, the status of the ESSF flag is tested at step 274. If the ESSF flag is set, the algorithm continues at step 342. If the ESSF flag is not set, the engine speed is compared to the engine cranking speed window of greater than 32 RPM and less than 480 RPM at step 276. If the engine speed indicates cranking (engine speed between 32 RPM and 480 RPM) for longer than 10 seconds at step 278, the algorithm continues at step 342. If the engine speed is not within the engine cranking speed window of greater than 32 RPM and less than 480 RPM at step 276, the engine speed is compared to an engine running value of 480 RPM at step 280. If the engine speed is in excess of 480 RPM at step 280, the algorithm continues at step 288. If, at step 282, the engine speed is found to have been less than or equal to 480 RPM for longer than 60 seconds since the preheat time period expired, the engine speed timeout (ESTO) flag is set at step 284. If 60 seconds has not elapsed since the preheat time expired at step 282, or if the ESTO flag is set at step 284, the algorithm returns to step 264. If the engine speed is detected as exceeding 480 RPM at step 280, postheat operation begins at step 288 and the status of the TSOC flag is tested. If the TSOC flag is set, the algorithm continues at step 294. IF the TSOC flag is not set at step 288, the sensor diagnostics subroutine of FIG. 3 is executed at step 290. At step 292, the status of the TSSC flag is tested. If a TSSC flag was set at step 290, the algorithm continues at step 342. If a TSSC flag was not set at step 290, or if the TSOC flag is set at step 288, the status of the ESSF flag is tested at step 294. If the ESSF flag is set at step 294, the algorithm continues at step 342. If the ESSF flag is not set, the engine speed is compared to an engine stall speed of 32 RPM at step 296.

Figure 2E:
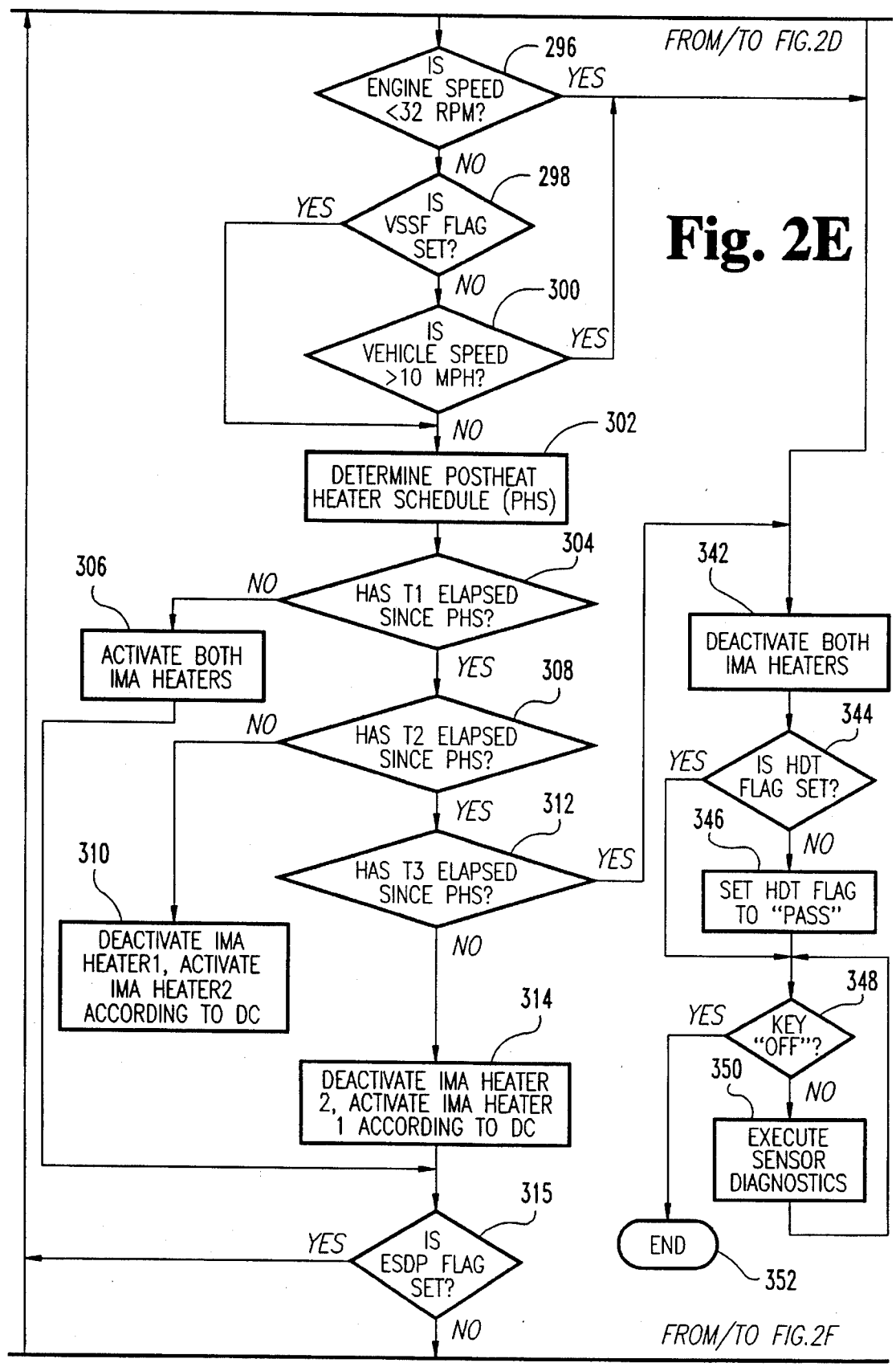
FIG. 2E is a continuation of the flowchart of FIG. 2D.
Figure 4:
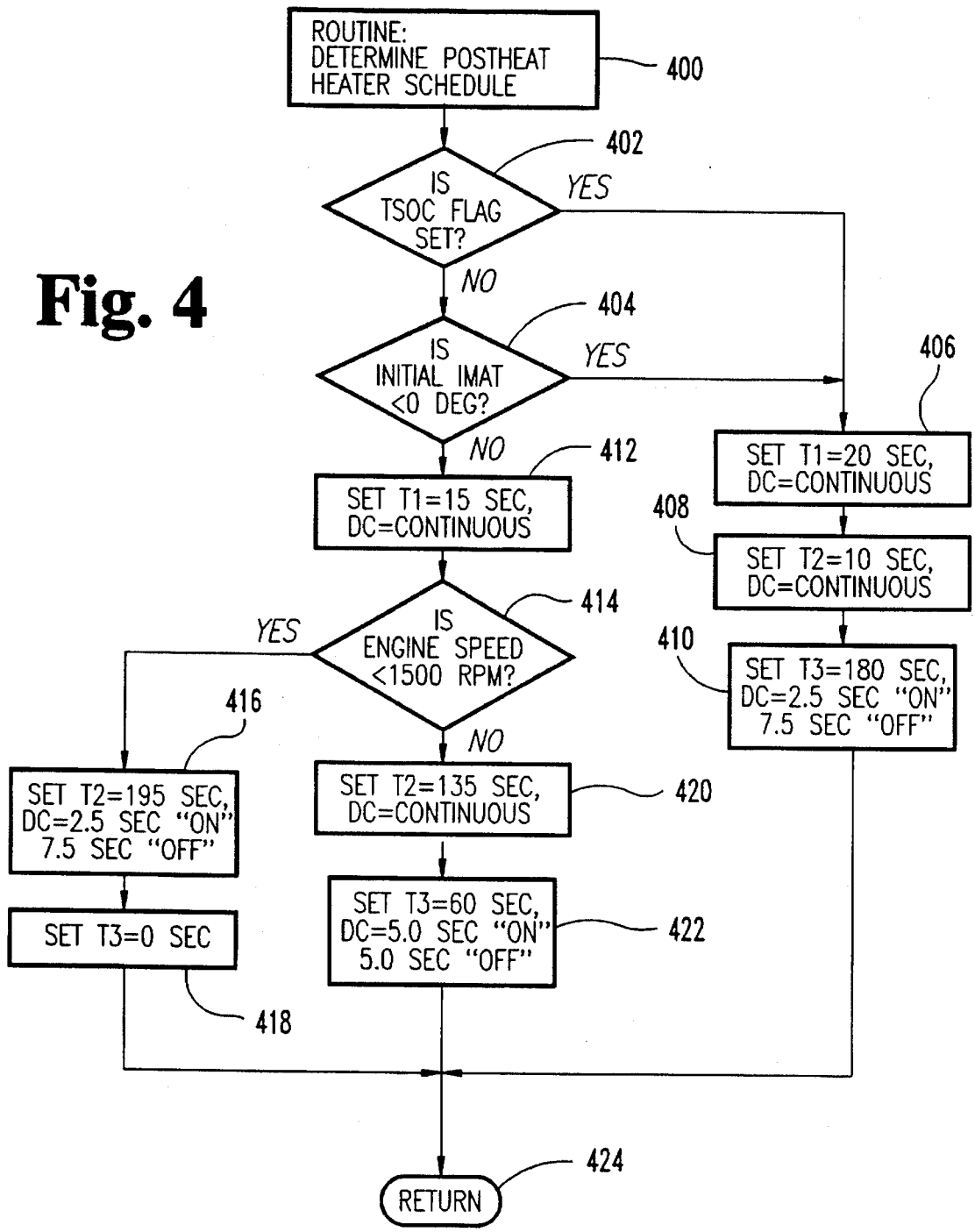
FIG. 4 is a flowchart of the postheat heater schedule subroutine of FIG. 2E.

Referring now to FIG. 2E, if the engine speed is less than 32 RPM at step 296 (engine stalled), the status of the VSSF flag is tested at step 298. If the VSSF flag is set at step 298, the algorithm continues at step 302. If the VSSF flag is not set at step 298, the vehicle speed is compared to a vehicle speed of 10 MPH at step 300. If the vehicle speed is in excess of 10 MPH, the algorithm continues at step 342. If the vehicle speed is less than or equal to 10 MPH, or if the VSSF flag was set at step 298, the postheat heater schedule (PHS) subroutine of FIG. 4 is executed at step 302. The PHS subroutine of FIG. 5 will be more fully described hereinafter.

If, at step 304, the postheat time period T1 has not elapsed since the postheat schedule was determined at step 302, both intake manifold air (IMA) heaters 26 and 28 are activated at step 306. If, at step 308, T1 has elapsed but the postheat time period T2 has not elapsed since the postheat schedule was determined at step 302, IMA heater 26 is deactivated and IMA heater 28 is activated according to a duty cycle determined within the PHS subroutine, at step 310. If, at step 312, T2 has elapsed but the postheat time period T3 has not elapsed since the postheat schedule was determined at step 302, IMA heater 28 is deactivated and IMA heater 26 is activated according to a duty cycle determined within the PHS subroutine, at step 314. If T3 has elapsed at step 312, then postheat is completed and the algorithm continues at step 342. When IMA heaters 26 and/or 28 have been activated/deactivated at steps 306, 310 or 314, the heater diagnostics check begins with testing the ESDP flag at step 315. If preheat was aborted due to engine cranking during preheat, thereby setting the ESDP flag, the algorithm continues from step 315 at step 288. If the ESDP flag is not set at step 315, program execution continues at step 316.

Figure 2F:
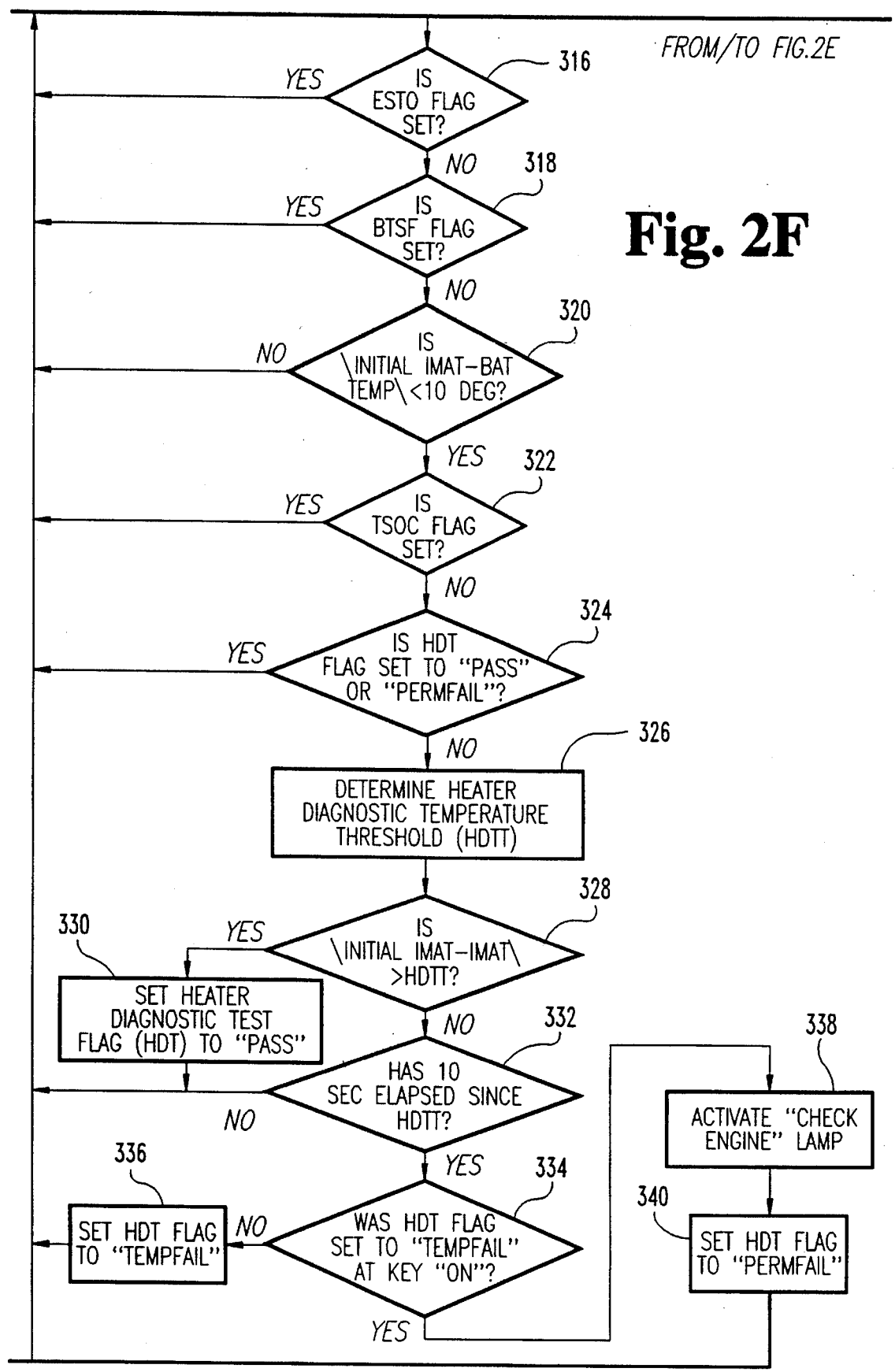
FIG. 2F is a continuation of the flowchart of FIG. 2E.
Figure 5:
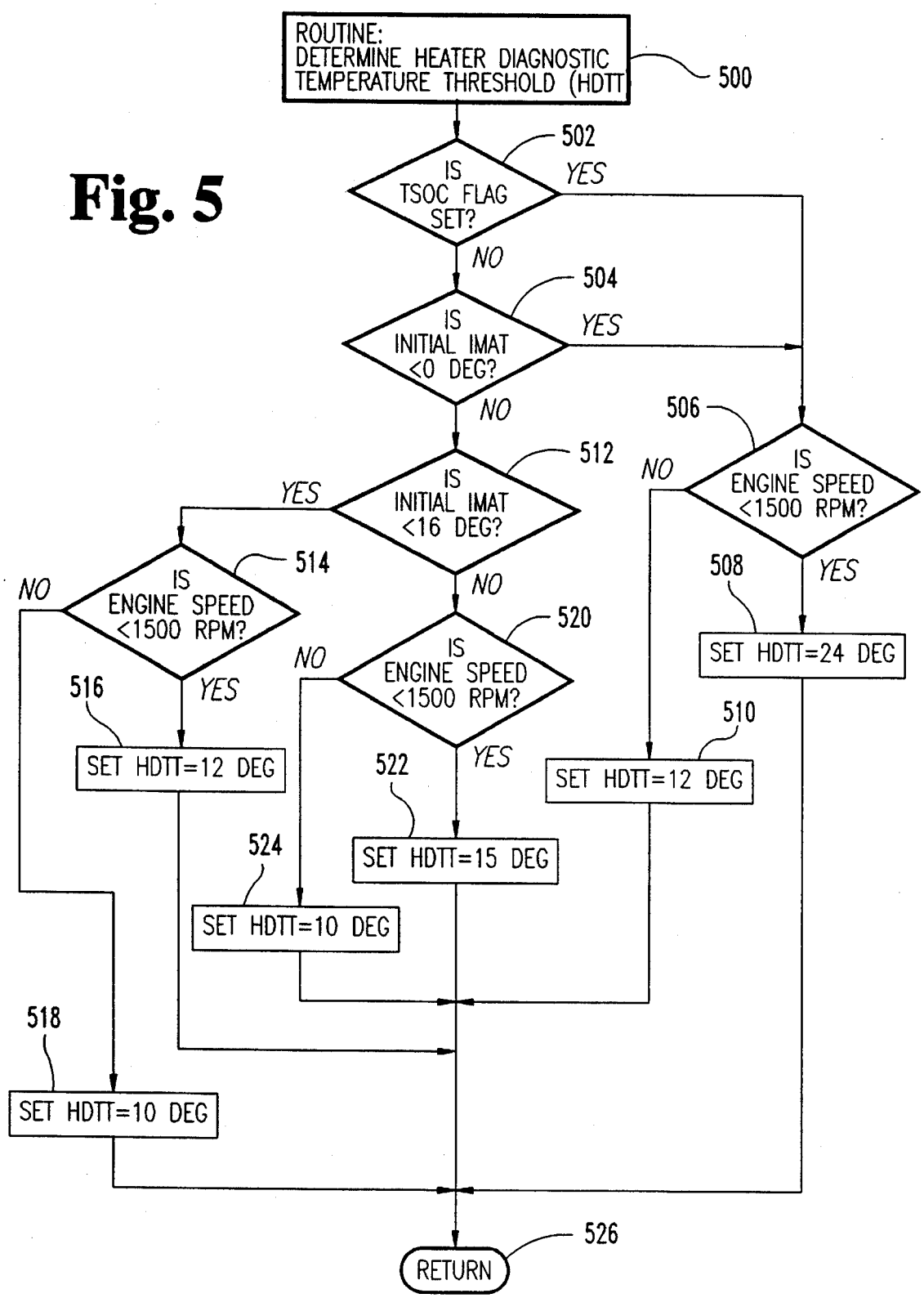
FIG. 5 is a flowchart of the heater diagnostic threshold temperature subroutine of FIG. 2F.

Referring now to FIG. 2F, if the ESDP flag was not set at step 315, the ESTO flag is tested at step 316. If the ESTO flag is set at step 316, the algorithm returns to step 288. If the ESTO flag is not set at step 316, the status of the battery temperature sensor fault (BTSF) flag is tested at step 318. If the BTSF flag is set, the algorithm returns to step 288. If the BTSF flag is not set, the most recently sensed battery temperature is compared to the initial IMAT reading at step 320. If, at step 320, the absolute value of the difference between the most recently sensed battery temperature and the initial IMAT reading is greater than or equal to 10 degrees F., the algorithm returns to step 288. If, however, the absolute value of this difference is less than 10 degrees F., the status of the TSOC flag is tested at step 322. If the TSOC flag is set at step 322, the algorithm returns to step 288. If the TSOC flag is not set, the status of the HDT flag is tested at step 324. If the HDT flag is set to "pass" or "permfail", the algorithm returns to step 288. If the HDT flag is not set to either "pass" or "permfail", the heater diagnostic temperature threshold (HDTT) subroutine of FIG. 5 is executed at step 326. The HDTT subroutine of FIG. 5 will be more fully described hereinafter.

The algorithm continues from step 326 at step 328 where the initial IMAT is compared to the most recently sensed IMAT. If the absolute value of the difference between the initial IMAT and the most recently sensed IMAT is in excess of HDTT, the heater diagnostic test (HDT) flag is set to pass at step 330. If, at step 332, the absolute value of the difference determined in step 328 is less than or equal to HDTT for less than 10 seconds, or if the HDT flag is set to "pass" at step 330, the algorithm returns to step 288. If, at step 332, the absolute value of the difference determined in step 330 is less than or equal to HDTT for longer than 10 seconds, the status of the HDT flag is tested at step 334. If the HDT flag was set to "tempfail" at key "on" (step 202), the "check engine" lamp 38 is activated at step 338 and the HDT flag is set to "permfail" at step 340. If, at step 334, the HDT flag was not set to "tempfail" at key "on" (step 202), the HDT flag is set to "tempfail" at step 336. After the HDT flag is set to "pass" at step 330, "tempfail" at 336 or "permfail" at step 340, the algorithm returns to step 288.

Referring back to FIG. 2E, if the TSSC flag was set at steps 258, 268 or 292, the engine was detected as having been started less than 25 times at step 260, the initial IMAT was greater than or equal to 60 degrees F. at step 262, the vehicle speed was in excess of 10 MPH at steps 272 or 300, the ESSF flag was set at steps 274 or 294, the engine was cranking (engine speed greater than 32 RPM and less than 480 RPM) for more than 10 seconds at step 278, the engine speed was less than 32 RPM at step 296 or the postheat time period T3 had elapsed since PHS at step 312, then postheat was either completed or aborted and, in either case, both IMA heaters 26 and 28 are deactivated at step 342. At step 344, the status of the HDT flag is tested. If the HDT flag was set (to "pass", "tempfail" or "permfail" at steps 330, 336 or 340 respectively), the algorithm continues at step 348. If the HDT flag has not yet been set at step 344, the HDT flag is set to "pass" at step 346. If the HDT flag had been set at step 344, or if the HDT flag was set at step 346, the status of the key switch 22 is tested at step 348. If the key switch 22 is not "off", the sensor diagnostic subroutine of FIG. 3 is executed at step 350. Until the key switch 22 is returned to the "off" position, the algorithm continuously alternates between testing the status of the key switch 22 at step 348 and executing the sensor diagnostics algorithm of FIG. 3 at step 350. If the key switch 22 is detected as being "off" at step 348, the algorithm terminates at step 352.

Referring now to FIG. 3, the sensor diagnostics subroutine begins at step 360. At step 362, the intake manifold air temperature (IMAT) is sensed. At step 364, IMAT is compared to a temperature value of 250 degrees F. If IMAT is in excess of 250 degrees F., the subroutine continues at step 366. At step 366, if IMAT has been in excess of 250 degrees for less than 5 seconds, the subroutine returns to step 362. If, at step 366, IMAT has been in excess of 250 degrees for more than 5 seconds, an intake manifold air temperature sensor short-circuit condition (TSSC) exists and a permanent TSSC flag is set at step 368. The "check engine" lamp 38 is thereafter activated at step 370. If IMAT is not in excess of 250 degrees F. at step 364, IMAT is compared to a temperature of −40 degrees F. at step 372. If IMAT is less than −40 degrees F. at step 372, the subroutine continues at step 374. If, at step 374, IMAT has been below −40 degrees F. for less than 5 seconds, the subroutine returns to step 362. If at step 374, IMAT has been below −40 degrees F. for at least 5 seconds, an intake manifold air temperature sensor open-circuit condition (TSOC) exists and a temporary TSOC flag is set at step 376. The check engine lamp is thereafter activated at step 378. If, at step 372, IMAT is greater than or equal to −40 degrees F., the subroutine continues at step 380.

If the "check engine" lamp is activated at steps 370 or 378, or if IMAT is determined to be between −40 degrees F. and 250 degrees F. at step 372, the engine speed is sensed at step 380. If, at step 382, the engine speed sensor is determined to be either open-circuited or short-circuited, the ESSF flag is set, and the "check engine" lamp 38 is activated, at step 384.

If, at step 382, the engine speed sensor is neither open-circuited nor short-circuited, or if the ESSF flag is set at step 384, the vehicle speed is sensed at step 386. If, at step 388, the vehicle speed sensor is determined to be either open-circuited or short circuited, the VSSF flag is set, and the "check engine" lamp 38 is activated, at step 390.

If, at step 388, the vehicle speed sensor is neither open-circuited nor short-circuited, or if the VSSF flag is set at step 390, the battery temperature is sensed at step 392. If, at step 394, the battery temperature is determined to be less than or equal to −40 degrees F., or greater than or equal to 250 degrees F., the BTSF flag is set, and the "check engine" lamp 38 is activated, at step 396. If the battery temperature is greater than −40 degrees F. and less than 250 degrees F. at step 394, or if the BTSF flag is set at step 396, the subroutine returns to the algorithm of FIGS. 2A–2F at step 398.

Referring now to FIG. 4, the postheat heater schedule subroutine begins at step 400, and at step 402 the status of the TSOC flag is tested. If the TSOC flag is set, the subroutine continues at step 406. If the TSOC flag is not set at step 402, the initial IMAT is compared to a temperature value of zero degrees F. at step 404. If the initial IMAT is greater than or equal to zero degrees F., the subroutine continues at step 412. If the initial IMAT is less than zero degrees F. at step 404, or if the TSOC flag was set at step 402, the postheat time period T1 is set to 20 seconds and the corresponding duty cycle is set to continuous, at step 406. The subroutine continues at step 408 where the postheat time period T2 is set at 10 seconds and the corresponding duty cycle is set to continuous. The subroutine continues at step 410 where the postheat time period T3 is set to 180 seconds and the corresponding duty cycle is set so that the appropriate IMA heater is continuously activated ("on") for 2.5 seconds and deactivated ("off") for 7.5 seconds.

If, at step 404, the initial IMAT was determined to be greater than or equal to zero degrees F., the T1 is set to 15 seconds and the corresponding duty cycle is set to continuous at step 412. The subroutine continues at step 414 where the engine speed is compared to an engine speed value of 1500 RPM. If the engine speed is greater than 1500 RPM, T2 is set to 135 seconds and the corresponding duty cycle is set to continuous at step 420. The subroutine continues then at step 422 where T3 is set to 60 seconds and the corresponding duty cycle is set so that the appropriate IMA heater is continuously activated ("on") for 5.0 seconds and deactivated ("off") for 5.0 seconds.

If, at step 414, the engine speed is less than 1500 RPM, T2 is set at 195 seconds and the corresponding duty cycle is set so that the appropriate IMA heater is continuously activated ("on") for 2.5 seconds and deactivated ("off") for 7.5 seconds, at step 416. The subroutine then continues at step 418 where T3 is set to zero seconds. After T3 is set at step 410, 418 or 422, the subroutine returns to the algorithm of FIGS. 2A–2F at step 424.

Referring now to FIG. 5, the heater diagnostic temperature threshold subroutine (HDTT) begins at step 500, and at step 502, the status of the TSOC flag is tested. If the TSOC flag is set, the subroutine continues at step 506. If the TSOC flag is not set at step 502, the initial IMAT is compared to a temperature value of zero degrees F. at step 504. If the initial IMAT is greater than or equal to zero degrees F., the subroutine continues at step 512. If the initial IMAT is less than zero degrees F. at step 504, or if the TSOC flag was set at step 502, the engine speed is compared to an engine speed value of 1500 RPM at step 506. If the engine speed is below 1500 RPM, HDTT is set to 24 degrees F. If the engine speed is above 1500 RPM at step 506, HDTT is set to 12 degrees F. at step 510.

If, at step 504, the initial IMAT was greater than or equal to zero degrees F., the initial IMAT is compared to a temperature value of 16 degrees F. at step 512. If the initial IMAT is greater than or equal to 16 degrees F., the subroutine continues at step 520. If the initial IMAT is less than 16 degrees F. at step 512, the engine speed is compared to an engine speed value of 1500 RPM at step 514. If the engine speed is greater than or equal to 1500 RPM, the HDTT is set to 12 degrees F. at step 516. If the engine speed is less than 1500 RPM at step 514, the HDTT is set to 10 degrees F. at step 518.

If, at step 512, the initial IMAT was greater than or equal to 16 degrees F., the engine speed is compared to an engine speed value of 1500 RPM at step 520. If the engine speed is greater than or equal to 1500 RPM, the HDTT is set to 15 degrees at step 522. If the engine speed is less than 1500 RPM at step 520, the HDTT is set to 10 degrees F. at step 524. After the HDTT is set at step 508, 510, 516, 518, 522 or 524, the subroutine returns to the algorithm of FIGS. 2A–2F at step 526.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A diagnostic system for warning a vehicle operator of a fault in an air intake heating system for supplying heated air to an internal combustion engine of the vehicle, said air intake heating system having means for sensing intake manifold air temperature and producing a temperature signal corresponding thereto, said engine having switch means for starting and stopping said engine, said switch means being switchable between "off", "on" and "crank" states, said system further having means for prompting said operator to wait for a predetermined time period prior to starting said engine after switching said switch means from said "off" state to said "on" state, said diagnostic system comprising:

means for storing first and second reference temperature signals, and first and second predetermined time periods;

means for warning said vehicle operator of an air intake heating system fault; and controller means for detecting air intake heating system faults and activating said warning means and said prompting means in response thereto, said controller means receiving said temperature signal and (a) continuously activating and deactivating said prompting means at a predetermined frequency in response to said temperature signal falling below said first reference temperature signal for at least said first predetermined time period, and (b) activating said warning means in response to said temperature signal exceeding said second reference temperature signal for at least said second predetermined time period, when said switch means is switched from said "off" state to said "on" state prior to starting said engine, until said switch means is returned to said "off" state.

2. The diagnostic system of claim 1 wherein said storing means includes means for storing a temporary fault flag and a permanent fault flag, said controller means storing said temporary fault flag within said storing means if said temperature signal falls below said first reference temperature signal for at least said first predetermined time period, and storing said permanent fault flag within said memory if said temperature signal exceeds said second reference temperature signal for at least said second predetermined time period.

3. The diagnostic system of claim 2 wherein said temperature signal produced by said means for sensing intake manifold air temperature is an analog temperature signal.

4. The diagnostic system of claim 3 wherein said controller means includes an analog-to-digital convertor, wherein said temperature signal received by said controller means is an analog temperature signal and said analog-to-digital converter receives said analog temperature signal and converts said analog temperature signal to a digital temperature signal corresponding thereto.

5. The diagnostic system of claim 3 wherein said controller means includes a microprocessor, said microprocessor having an analog-to-digital convertor portion, said analog-to-digital convertor portion of said microprocessor receiving said analog temperature signal and converting said analog temperature signal to a digital temperature signal corresponding thereto, and wherein said microprocessor activates said warning means and said prompting means in response to said digital temperature signal.

6. The diagnostic system of claim 2 wherein said temperature signal produced by said means for sensing intake manifold air temperature is a digital signal.

7. The diagnostic system of claim 2 wherein said means for sensing intake manifold air temperature includes an electronic temperature sensor, and wherein storing said temporary fault flag corresponds to an open-circuit fault in said electronic temperature sensor and storing said permanent fault flag corresponds to a short-circuit fault in said electronic temperature sensor.

8. The diagnostic system of claim 2 wherein said controller means includes means for activating said warning means in response to said temperature signal falling below said first reference temperature signal for at least said predetermined time period.

9. A method of warning a vehicle operator of a fault in an air intake heating system for supplying heated air to an internal combustion engine of the vehicle, said air intake heating system having means for sensing intake manifold air temperature, said engine having switch means for starting and stopping said engine, said switch means being switchable between "off", "on" and "crank" states, said method comprising the steps of:

(1) switching said switch means from said "off" state to said "on" state;

(2) sensing intake manifold air temperature;

(3) comparing said sensed intake manifold air temperature to a first and second reference temperature;

(4) warning said vehicle operator of one of
 (a) a first fault condition if said sensed intake manifold air temperature falls below said first reference temperature for at least a first predetermined time period, and
 (b) a second fault condition if said sensed intake manifold air temperature exceeds said second reference temperature for at least a second predetermined time period; and (5) continuously performing steps (2)–(4) from the time the switch means is switched on prior to starting said engine and during the time the engine is operating after the switch has been switched to the "crank" state until said switch means is switched to said "off" state to thereby stop said engine.

10. The method of claim 9 wherein said air intake heating system further includes means for storing data and said method further includes the steps of:

(4.1) performing steps (4.2)–(4.3) if one of said first and second fault conditions is detected;

(4.2) storing a temporary fault flag within said storing means if said first fault condition is detected; and (4.3) storing a permanent fault flag within said storing means if said second fault condition is detected;

and wherein performing step (5) is conditioned upon neither of said first and second fault conditions being detected.

11. The method of claim 10 wherein said means for sensing intake manifold air temperature includes at least one temperature sensor, and wherein said first fault condition corresponds to an open-circuit condition within said temperature sensor and said second fault condition corresponds to a short-circuit condition within said temperature sensor.

12. A diagnostic system for detecting faults in an air intake heating system for supplying heated air to an internal combustion engine of a vehicle, said air intake heating system having means for sensing intake manifold air temperature and producing a temperature signal corresponding thereto, means for sensing engine speed level and producing an engine speed signal corresponding thereto and means for heating said intake manifold air, said engine having switch means for starting and stopping said engine, said switch means being switchable between "off", "on" and "crank" states, said means for sensing intake manifold air temperature sensing an initial air temperature when said switch means is switched from said "off" state to said "on" state prior to starting said engine, said diagnostic system comprising:

means for storing a number of temperature threshold levels, a predetermined time period and a number of flags; and controller means for detecting air intake heating system faults, said controller means receiving said temperature and engine speed signals and continuously computing the difference between said intake manifold air temperature and said initial temperature for a predetermined postheat time period, and storing a first flag within said storing means if said difference exceeds a particular one of said number of temperature threshold levels within said predetermined time period, and storing a second flag within said storing means if said difference has not exceeded said particular one of said number of temperature threshold levels within said predetermined time period;

said controller means storing either of said first and second flags in accordance with said difference if said intake air temperature is below a first predetermined temperature and said engine speed is above a first predetermined RPM level, said controller means otherwise storing only said first flag within said storing means regardless of said difference if either said initial air temperature is above a first predetermined temperature or said engine speed is below a first predetermined RPM level.

13. The diagnostic system of claim 12 wherein said air intake heating system further includes means for warning an operator of said vehicle of an air intake heating system fault;

and wherein said controller means stores a third flag within said storing means and continuously activates said warning means until said switch means is switched to said "off" state if said difference has not exceeded said particular one of said number of temperature threshold levels within said predetermined time period, and removes said second flag from said storing means if said difference exceeds said particular one of said number of predetermined temperature threshold levels within said predetermined time period, if said second flag was stored within said storing means prior to switching said switch means from said "off" state to said "on" state.

14. The diagnostic system of claim 13 wherein said number of temperature threshold levels includes a first plurality of temperature threshold levels associated with a first range of initial temperatures, a second plurality of temperature threshold levels associated with a second range of initial temperatures and a third plurality of temperature threshold levels associated with a third range of initial temperatures, and wherein said particular one of said number of temperature threshold levels is associated with one of said first, second and third ranges of initial temperatures.

15. The diagnostic system of claim 14 wherein said first, second and third pluralities of temperature threshold levels each include at least a first temperature threshold level associated with a first engine speed range and a second temperature threshold level associated with a second engine speed range, and wherein said particular one of said number of temperature threshold levels is associated with one of said first and second engine speed ranges.

16. The diagnostic system of claim 15 wherein said first engine speed range is less than said second engine speed range and said particular one of said number of temperature threshold levels for any of said first, second and third initial temperature ranges is initially said first temperature threshold level, said particular one of said number of temperature threshold levels changing to said second temperature threshold level for the duration of said postheat time period if said engine achieves an engine speed within said second engine speed range.

17. The diagnostic system of claim 12 wherein said air intake heating system further includes means for sensing battery temperature and producing a battery temperature signal corresponding thereto, and wherein said controller means receives said battery temperature signal and detects air intake heating system faults if said battery temperature is approximately equal to said initial temperature, said controller means otherwise storing said first flag within said storing means.

18. The diagnostic system of claim 12 wherein said air intake heating system further includes means for sensing vehicle speed and producing a vehicle speed signal corresponding thereto, and wherein said controller means receives said vehicle speed signal and detects air intake heating system faults so long as said vehicle speed remains below a predetermined vehicle speed level, said controller means otherwise storing said first flag within said storing means.

19. The diagnostic system of claim 12 wherein said controller means includes means for detecting the number of times said engine has been started, and wherein said controller means detects air intake heating system faults if said number of times said engine has been started exceeds a predetermined number, said controller means otherwise storing said first flag within said storing means.

20. A method of detecting faults in an air intake heating system for supplying heated air to an internal combustion engine of a vehicle, said air intake heating system having means for sensing intake manifold air temperature, means for sensing engine speed, means for heating said intake manifold air and a memory, said engine having switch means for starting and stopping said engine, said switch means being switchable between "off", "on" and "crank" states, said method comprising the steps of:

(1) switching said switch means from said "off" state to said "on" state prior to starting said engine;

(2) sensing an initial intake manifold air temperature when said switch means is switched from said "off" state to said "on" state;

(3) sensing engine speed after starting said engine;

(4) performing steps (5)–(7) if said initial intake manifold air temperature is below a predetermined temperature level and said engine speed is above a predetermined RPM level, and otherwise storing a first flag within said memory;

(5) sensing air manifold temperature and determining the difference between said intake manifold air temperature and said initial intake manifold air temperature;

(6) storing said first flag within said memory if said difference exceeds a predetermined temperature threshold level within a first predetermined time period;

(7) storing a second flag within said memory if said difference does not exceed said predetermined temperature threshold level within said first predetermined time period; and (8) performing steps (5)–(7) for a second predetermined time period unless one of said first and second flags is stored within said memory.

21. The method of claim 20 wherein said air intake heating system further includes means for warning an operator of said vehicle of an air intake heating system fault, said method further including the steps of:

(7.1) performing steps (7.2)–(7.3) if said second flag existed within said memory prior to performing step (1)

(7.2) clearing said second flag from said memory if said difference exceeds said predetermined temperature threshold level within said first predetermined time period; and (7.3) storing a third flag within said memory and activating said warning means until said switch means is switched to said "off" state, if said difference does not exceed said predetermined temperature threshold level within said first predetermined time period, and wherein step (8) further includes performing steps (7.1)–(7.3) unless one of said second flag is cleared from said memory and said third flag is stored within said memory.

22. The method of claim 21 wherein said first flag is a "pass" flag, said second flag is a "temporary fail" flag and said third flag is a "permanent fail" flag.

23. The method of claim 20 wherein said air intake heating system further includes means for sensing battery temperature, and wherein step (2) further includes sensing said battery temperature and step (4) is further conditioned upon said battery temperature being approximately equal to said initial intake manifold air temperature.

24. The method of claim 20 wherein said air intake heating system further includes means for sensing battery temperature, means for detecting whether said battery temperature sensing means has a fault condition associated therewith and said memory has a fourth flag therein if said battery temperature sensing means fault condition exists, and wherein step (4) is further conditioned upon said fourth flag being absent from said memory;

and further including the step of activating said warning means until said switch means is switched to said "off" state if said battery temperature sensing means fault condition exists.

25. The method of claim 24 wherein said means for sensing battery temperature includes a battery temperature sensor and said fault condition includes an open-circuited battery temperature sensor and a short-circuited battery temperature sensor.

26. The method of claim 20 wherein said air intake heating system further includes means for detecting whether said engine speed sensing means has a fault condition associated therewith and said memory has a fifth flag therein if said engine speed sensing means fault condition exists, and wherein step (4) is further conditioned upon said fifth flag being absent from said memory;

and further including the step of activating said warning means until said switch means is switched to said "off" state if said engine speed sensing means fault condition exists.

27. The method of claim 26 wherein said means for sensing engine speed includes an engine speed sensor and said fault condition includes an open-circuited engine speed sensor and a short-circuited engine speed sensor.

28. The method of claim 20 wherein said processor means includes means for detecting the number of times said engine has been started, and wherein step (4) is further conditioned upon said number of times said engine has been started exceeding a predetermined number.

29. The method of claim 20 wherein step (4) is further conditioned upon said engine speed being within a predetermined cranking speed range for less than a predetermined time period when said switch means is in said "crank" position.

30. The method of claim 20 wherein said air intake heating system further includes means for sensing vehicle speed, and wherein step (8) is performed so long as said vehicle speed is below a predetermined vehicle speed threshold limit, and otherwise storing said first flag within said memory.

31. The method of claim 20 wherein step (8) is performed so long as said engine speed remains above a predetermined stall speed, and otherwise storing said first flag within said memory.

32. The method of claim 26 wherein said air intake heating system further includes means for sensing vehicle speed, means for detecting whether said vehicle speed sensing means has a fault condition associated therewith, and said memory has a sixth flag therein if said vehicle speed sensing means fault condition exists, and wherein step (4) is further conditioned upon said fourth flag being absent from said memory;

and further including the step of activating said warning means until said switch means is switched to said "off" state if said vehicle speed sensing means fault condition exists.

33. The method of claim 32 wherein said vehicle speed sensing means includes a vehicle speed sensor and said vehicle speed sensing fault condition includes an open-circuited vehicle speed sensor and a short-circuited vehicle speed sensor.

34. An air intake heating and diagnostic system for use with a vehicle having an internal combustion engine, said system comprising:

means for sensing intake manifold air temperature and producing a temperature signal corresponding thereto;

means for starting and stopping said engine, said starting and stopping means being switchable between "off", "on" and "crank" states and producing an ignition signal corresponding to each of said states, said manifold air intake temperature sensing means sensing an initial intake manifold air temperature when said ignition signal is switched from said "off" state to said "on" state;

means for warning said operator of said vehicle of a fault condition detected in said system;

means for heating intake manifold air; and means for controlling said air intake heating means for a variable preheat time period prior to starting said engine, said controller means having a first input for receiving said temperature signal and a second input for receiving said ignition signal, said controller means receiving said temperature and ignition signals, and responding to a first fault condition by replacing said variable preheat time period with a predetermined preheat time period and activating said intake manifold air heating means, if said temperature signal falls below a first predetermined temperature level for at least a first predetermined time period, and responding to a second fault condition by activating said warning means, deactivating said intake manifold air heating means and ending said variable preheat time period, if said temperature signal exceeds a second predetermined temperature level for at least a second predetermined time period, said controller means activating said intake manifold air heating means for said variable preheat time period in accordance with predetermined ranges of said initial temperature if neither of said first and second fault conditions are detected within said variable preheat time period and said initial temperature is below a threshold temperature level.

35. The air intake heating and diagnostic system of claim 34 further including:

means for prompting an operator of said vehicle to wait for said variable preheat time period after switching said starting and stopping means from said "off" state to said "on" state before switching said starting and stopping means from said "on" state to said "crank" state to thereby start said engine;

wherein said controller means continuously activates and deactivates said prompting means for said variable preheat time period in further response to said first fault condition, and wherein said controller means further activates said prompting means for said variable preheat time period if said initial temperature is below said threshold temperature level, and deactivates said prompting means prior to ending said variable preheat time period if said second fault is detected.

36. The air intake heating and diagnostic system of claim 35 wherein said means for prompting includes a light source viewable by said operator and said controller means continuously activates and deactivates said light source by switching said light source on and off at a predetermined frequency.

37. The air intake heating and diagnostic system of claim 35 further including:

means for sensing engine speed and providing an engine speed signal corresponding thereto;

wherein said controller means has a third input for receiving said engine speed signal, and wherein said controller means receives said engine speed signal and deactivates said intake manifold air heating means and said prompting means, if said engine speed exceeds a predetermined cranking RPM level.

38. The air intake heating and diagnostic system of claim 34, wherein said controller means includes means for storing at least a first fault flag and a second fault flag therein, and wherein said controller means stores said first fault flag within said storing means when said first fault condition is detected, and stores said second fault flag within said storing means when said second fault condition is detected.

39. The air intake heating and diagnostic system of claim 38 wherein said means for sensing said intake manifold air temperature includes a temperature sensor, said first fault condition corresponding to said temperature sensor being open-circuited and said second fault condition corresponding to said temperature sensor being short-circuited.

40. The air intake heating and diagnostic system of claim 34, wherein said means for heating intake manifold air includes at least two intake manifold air heaters, each of said heaters is coupled to said controller means through a power relay, and each of said power relays is connected to a source of power, and wherein said controller means activates said intake manifold air heating means by supplying a heating signal to each of said power relays, and each of said power relays responds to said heating signal by coupling said power source to a corresponding one of said intake manifold air heaters to thereby energize said intake manifold air heaters.

41. The air intake heating and diagnostic system of claim 34 wherein said controller means includes means for activating said warning means in response to said first fault condition.

42. A method of controlling an air intake heating system for an internal combustion engine of a vehicle for a variable preheat time period prior to starting said engine, said air intake heating system having means for sensing intake manifold air temperature, means for heating intake manifold air, means for warning an operator of said vehicle of a fault detected in said system and means for prompting said operator to wait for said variable preheat time period prior to starting said engine, said engine having switch means for starting and stopping said engine, said switch means being switchable between "off", "on" and "crank" states, said method comprising the steps of:

(1) switching said switch means from said "off" state to said "on" state prior to starting said engine and sensing an initial intake manifold air temperature when said switch means is switched from said "off" state to said "on" state;

(2) performing steps (3)–(13) for said variable preheat time period in accordance with said initial intake manifold air temperature, if said initial intake manifold air temperature is below a first predetermined temperature level;

(3) activating said prompting means;

(4) sensing said intake manifold air temperature and comparing said intake manifold air temperature to first and second reference temperatures;

(5) performing steps (6)–(8) if said intake manifold air temperature falls below said first reference temperature for a first predetermined time period;

(6) setting said variable preheat time period to a predetermined preheat time period;

(7) activating said intake manifold air heating means;

(8) continuously activating and deactivating said prompting means at a predetermined frequency;

(9) performing steps (10)–(12) if said intake manifold air temperature exceeds said second reference temperature for a second predetermined time period;

(10) deactivating said intake manifold air heating means and said prompting means if said intake manifold air heating means and said prompting means are activated;

(11) activating said warning means;

(12) ending said variable preheat time period; and

(13) otherwise activating said intake manifold air heating means.

43. The method of claim 42 wherein said air intake heating system further includes means for storing a number of fault flags, and wherein step (9) includes storing a first fault flag within said storing means, and further wherein step (12) includes storing a second fault flag within said storage means.

44. The method of claim 43 wherein said air intake heating system further includes means for sensing engine speed, and wherein step (2) is further conditioned upon said engine speed being below a predetermined cranking RPM level.

45. The method of claim 42 wherein said variable preheat time period corresponds to one of a plurality of initial intake manifold air temperature ranges.

46. The method of claim 45 wherein said plurality of initial intake manifold air temperature ranges includes at least first, second and third temperature ranges, said variable preheat time period being set to a first preheat time period if said initial intake manifold temperature falls within said first temperature range, a second preheat time period if said initial intake manifold temperature falls within said second temperature range and a third preheat time period if said initial intake manifold temperature falls within said third temperature range.

47. The method of claim 46 wherein said first temperature range in below said first predetermined temperature level and has a lower temperature limit of a second predetermined temperature level said second temperature range is below said second predetermined temperature level and has a lower temperature limit of a third predetermined temperature level and said third temperature range is below said third predetermined temperature level.

48. The method of claim 47 wherein said predetermined preheat time period of step (6) is equal to said third preheat time period.

49. The method of claim 42 wherein step (7) includes the step of activating said warning means.

50. An air intake heating and diagnostic system for use with a vehicle having an internal combustion engine, said system comprising:

means for sensing intake manifold air temperature and producing a temperature signal corresponding thereto;

means for sensing engine speed and producing an engine speed signal corresponding thereto;

means for starting and stopping said engine, said starting and stopping means being switchable between "off", "on" and "crank" states and producing an ignition signal corresponding to each of said states, said means for sensing manifold air temperature sensing an initial temperature when said starting and stopping means is switched from said "off" state to said "on" state prior to starting said engine;

means for heating intake manifold air; and means for controlling said intake manifold air heating means for a predetermined postheat time period after starting said engine, said controller means having memory, a first input for receiving said temperature signal, a second input for receiving said engine speed signal and a third input for receiving said ignition signal, said controller means receiving said temperature, engine speed and iginition signals and activating said intake manifold air heating means for said predetermined postheat time period in accordance with predetermined ranges of said initial temperature and predetermined ranges of said engine speed if said initial temperature is below a first predetermined temperature and said engine speed is above a predetermined RPM level, said controller means further continuously computing the difference between said intake manifold air temperature and said initial temperature for the duration of said predetermined postheat time period, and storing a first flag within said memory if said difference exceeds a predetermined threshold temperature level, and storing a second flag within said memory if said difference has not exceeded said predetermined threshold temperature level within a first predetermined time period.

51. The air intake heating and diagnostic system of claim 50, wherein said air intake heating system further includes means for warning an operator of said vehicle of an air intake heating system fault, and wherein said processor means stores a third flag within said memory and continuously activates said warning means if said difference has not exceeded said predetermined threshold temperature level within said first predetermined time period, and removes said second flag from said memory if said difference exceeds said predetermined threshold temperature level within said first predetermined time period, if said second flag was stored within said memory prior to switching said starting and stopping means from said "off" state to said "on" state.

52. A method of controlling an air intake heating system for an internal combustion engine of a vehicle after starting said engine, said air intake heating system having means for sensing intake manifold air temperature, means for sensing engine speed, means for heating intake manifold air and electronic memory, said engine having switch means for starting and stopping said engine, said switch means being switchable between "off", "on" and "crank" states, said method comprising the step of:

(1) switching said switch means from said "off" state to said "on" state prior to starting said engine and sensing an initial intake manifold air temperature when said switch means is switched from said "off" state to said "on" state;

(2) sensing engine speed after starting said engine and performing steps (3)–(7) if said engine speed exceeds a predetermined RPM level and said initial intake manifold air temperature is below a first predetermined temperature level, and otherwise storing a first flag within said memory;

(3) activating said intake manifold air heater means in accordance with predetermined ranges of said initial intake manifold air temperature and predetermined ranges of said engine speed;

(4) continuously sensing said intake manifold air temperature;

(5) determining the difference between said intake manifold air temperature and said initial intake manifold air temperature;

(6) storing a first flag within said memory if said difference exceeds a predetermined threshold temperature;

(7) storing a second flag within said memory if said difference does not exceed said predetermined threshold temperature within a first predetermined time period; and (8) performing steps (3)–(7) for a predetermined postheat time period unless one of said first and second flags is stored within said memory.

53. The method of claim 52 wherein said air intake heating system further includes means for warning an operator of said vehicle of an air intake heating system fault, said method further including the steps of:

(7.1) performing steps (7.2)–(7.3) if said second flag existed within said memory prior to performing step (1)

(7.2) clearing said second flag from said memory if said difference exceeds said predetermined threshold temperature within said first predetermined time period; and (7.3) storing a third flag within said memory and activating said warning means if said difference does not exceed said predetermined threshold temperature within said first predetermined time period.

and wherein step (2) further includes performing steps (7.1)–(7.3) unless one of said second flag is cleared from said memory and said third flag is stored within said memory.

54. The method of claim 52 wherein said predetermined ranges of said intake manifold air temperature include at least first, second and third temperature ranges, and wherein said first temperature range is below said first predetermined temperature level and has a lower temperature limit of a second predetermined temperature level said second temperature range is below said second predetermined temperature level and has a lower temperature limit of a third predetermined temperature level and said third temperature range is below said third predetermined temperature level.

55. The method of claim 54 wherein said intake manifold air heater means includes at least a first heater and a second heater, and wherein step (3) further includes the steps of:

(3.1) performing steps (3.2)–(3.4) if said initial intake manifold air temperature is within said third temperature range;

(3.2) operating said first and second heaters continuously for a first postheat time period;

(3.3) operating said first heater continuously for a second postheat time period after said first postheat time period has expired; and (3.4) operating said second heater at a first duty cycle for a third postheat time period after said second postheat time period has expired.

56. The method of claim 55 wherein step (3) further includes the steps of;

(3.5) performing the steps of (3.6)–(3.9) if said initial intake manifold air temperature is within one of said first and second temperature ranges;

(3.6) operating said first and second heaters continuously for a fourth postheat time period;

(3.7) operating said first heater at said first duty cycle for a fifth postheat time period after said fourth postheat time period expires, if said engine speed is below a predetermined RPM threshold level; and (3.8) operating said first heater continuously for a sixth postheat time period after said fifth postheat time period expires and operating said second heater at a second duty cycle for a seventh postheat time period after said sixth postheat time period expires, if said engine speed is above said predetermined RPM threshold level.

57. The method of claim 56 wherein the time periods for each of said first and second duty cycles are equal.

58. An air intake heating and diagnostic system for use with a vehicle having an internal combustion engine, said system comprising:

at least one temperature sensor for sensing intake manifold air temperature and producing a temperature signal corresponding thereto;

at least one engine speed sensor for sensing engine speed and producing an engine speed signal corresponding thereto;

a switch for stating and stopping said engine, said switch being switchable between "off", "on " and "crank" states and producing an ignition signal corresponding to each of said states, said temperature sensor sensing an initial air temperature when said switch is switched from said "off" state to said "on " state prior to starting said engine;

means for prompting and operator of said vehicle to wait a variable preheat time period after switching said switch from said "off" state to said "on" state before switching said switch from said "on" state to said "crank" state to thereby start said engine;

means for warning said operator of said vehicle of a fault condition detected in said system;

a number of intake manifold air heaters; and a controller for controlling said intake manifold air heaters, said controller having memory, a first input for receiving said temperature signal, a second input for receiving said ignition signal ad a third input for receiving said engine speed signal, said controller receiving said temperature, ignition and engine speed signals, and activating said warning means until said switch is switched to said "off" state if said temperature sensor is detected as being short circuited, activating said intake manifold air heaters and continuously activating and deactivating said prompting means at a predetermined frequency for a predetermined preheat time period if said temperature sensor is detected as being open-circuited, activating said intake manifold air heaters for said variable preheat time period in accordance with predetermined ranges of said initial temperature is said temperature sensor is detected as being neither of open-circuited and short-circuited within said variable preheat time period, activating said intake manifold heaters for a predetermined postheat time period after starting said engine in accordance with said predetermined ranges of said initial temperature and predetermined ranges of said engine speed, if said temperature sensor is not detected as being short-circuited, storing a "pass" flag within said memory if said intake manifold air heater are detected as operating during said predetermined postheat time period, and storing a "fail" flag within said memory if said intake manifold air heaters are detected as being inoperable during said predetermined postheat time period.

59. A method of controlling an air intake heating system for an internal combustion engine of a vehicle, said air intake heating system having means for sensing intake manifold air temperature, means for sensing engine speed, means for heating intake manifold air, means for warning an operator of said vehicle of a fault within said system and electronic memory, said engine having switch means for starting and stopping said engine, said switch means being switchable between "off", "on" and "crank" states, said system further having means for prompting said operator to wait before switching said switch means from said "on " state to said "crank" state, after switching said switch means from said "off" state to said "on" state prior to starting said engine, said method comprising the steps of:

(1) switching said switch means from said "off" state to said "on" state prior to starting said engine;

(2) sensing an initial intake manifold air temperature when said switch means is switched from said "off" state to said "on" state;

(3) continuously monitoring said temperature sensor means for one of an open-circuit fault and a short-circuit fault;

(4) performing steps (5)–(7) if said initial intake manifold air temperature is below a predetermined temperature;

(5) activating said intake manifold air temperature heating mens, and continuously activating and deactivating said prompting means at a predetermined frequency, for a predetermined preheat time period and storing a first flag within said memory, if said open-circuit fault is detected;

(6) activating said warning means until said switch means is returned to said "off" state, storing a second flag within said memory and deactivating said intake manifold air heating means, if said short-circuit fault is detected;

(7) activating said intake manifold air heating means for a variable preheat time period in accordance with predetermined ranges of said initial temperature if either of said open-circuit fault and said short-circuit fault is detected within said variable preheat time period;

(8) sensing engine speed and performing steps (9)–(11) if said engine speed exceeds a predetermined RPM level and said initial intake manifold air temperature is below said predetermined temperature;

(9) activating said intake manifold air heater means for a predetermined postheat time period in accordance with predetermined ranges of sid initial temperature and predetermined ranges of said engine speed;

(10) storing a third flag within said memory if said intake manifold air heater means is detected as operating during said predetermined postheat time period, and

(11) storing a fourth flag within said memory if said intake manifold air heater means is detected as being inoperable during said predetermined postheat time period.

60. The method of claim 59 wherein steps (10) and (11) are further conditioned upon said engine speed being above a predetermined running RPM level within a predetermined time period after said variable preheat time period has expired.

61. The method of claim 59 wherein steps (10) and (11) are further conditioned upon said engine speed being below a predetermined cranking RPM level during said variable preheat time period.

62. The method of claim 59 wherein steps (10) and (11) are further conditioned upon said variable preheat time period ending.

63. The method of claim 59 wherein steps (10) and (11) are further conditioned upon said open-circuit fault not being detected.

64. The method of claim 59 wherein step (5) further includes the step of activating said warning means until said switch means is returned to said "off" state.

* * * * *